US012804442B2

(12) United States Patent
Li et al.

(10) Patent No.: US 12,804,442 B2
(45) Date of Patent: Nov. 17, 2026

(54) BEAM MEASUREMENT METHOD AND APPARATUS, MEASUREMENT CONFIGURATION METHOD AND APPARATUS, TERMINAL AND NETWORK DEVICE

(71) Applicant: DATANG MOBILE COMMUNICATIONS EQUIPMENT CO., LTD., Beijing (CN)

(72) Inventors: Hui Li, Beijing (CN); Yajuan Luo, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 289 days.

(21) Appl. No.: 18/695,779

(22) PCT Filed: Sep. 7, 2022

(86) PCT No.: PCT/CN2022/117545
§ 371 (c)(1),
(2) Date: Mar. 26, 2024

(87) PCT Pub. No.: WO2023/051203
PCT Pub. Date: Apr. 6, 2023

(65) Prior Publication Data

US 2025/0133432 A1 Apr. 24, 2025

(30) Foreign Application Priority Data

Sep. 30, 2021 (CN) .......................... 202111162619.9

(51) Int. Cl.
*H04W 24/10* (2009.01)
*H04B 7/06* (2006.01)
*H04B 17/309* (2015.01)

(52) U.S. Cl.
CPC .......... *H04W 24/10* (2013.01); *H04B 7/0626* (2013.01); *H04B 17/309* (2015.01)

(58) Field of Classification Search
CPC .... H04W 24/10; H04B 7/0626; H04B 17/309
See application file for complete search history.

(56) References Cited

U.S. PATENT DOCUMENTS 10,609,611 B2 * 3/2020 Park ...................... H04W 16/28
2019/0261234 A1 * 8/2019 Park .................... H04W 36/085
(Continued)

FOREIGN PATENT DOCUMENTS

CN 109804592 A 5/2019
CN 110381531 A 10/2019
(Continued)

OTHER PUBLICATIONS

Supplementary Partial European Search Report in the corresponding EP Patent Application No. 22874592.3, issued on Dec. 17, 2024.
(Continued)

*Primary Examiner* — Kenny S Lin
(74) *Attorney, Agent, or Firm* — Ladas & Parry, LLP

(57) ABSTRACT

Provided are a beam measurement method and apparatus, a measurement configuration method and apparatus, a terminal and a network device. The beam measurement method comprises: receiving, by a terminal, resource configuration information for beam measurement transmitted by a network device, where the resource configuration information includes beam measurement resources and first information; and performing, by the terminal, beam measurement according to the beam measurement resources and the first information, where the first information includes at least one of the following: a parameter of a physical cell identifier list; indication information associated with physical cell identifiers; or first indexes of the beam measurement resources,
(Continued)

where the first indexes implicitly indicate physical cell identifiers.

17 Claims, 2 Drawing Sheets

(56) References Cited

U.S. PATENT DOCUMENTS

| | | | | |
|---|---|---|---|---|
| 2020/0028599 | A1 | 1/2020 | Zhang et al. | |
| 2020/0053607 | A1* | 2/2020 | Ingale | H04W 36/304 |
| 2020/0068457 | A1 | 2/2020 | You | |
| 2021/0051502 | A1 | 2/2021 | Yamada | |
| 2021/0153085 | A1 | 5/2021 | Rahman | |
| 2021/0219154 | A1* | 7/2021 | Han | H04B 7/0617 |
| 2022/0263558 | A1* | 8/2022 | Zhu | H04B 7/0626 |
| 2022/0295323 | A1 | 9/2022 | Wang | |
| 2022/0312354 | A1* | 9/2022 | Teyeb | H04B 7/06952 |
| 2024/0224094 | A1* | 7/2024 | Li | H04B 17/336 |

FOREIGN PATENT DOCUMENTS

| | | | |
|---|---|---|---|
| WO | 2018053767 | A1 | 3/2018 |
| WO | 2018059487 | A1 | 4/2018 |
| WO | 2021161065 | A1 | 8/2021 |
| WO | 2022146116 | A1 | 7/2022 |

OTHER PUBLICATIONS

International Search Report in International application No. PCT/CN2022/117545, issued on Nov. 25, 2022, with English translation provided by WIPO.

Written Opinion of the International Searching Authority in International application No. PCT/CN2022/117545, issued on Nov. 25, 2022, with English translation provided by WIPO.

International Preliminary Report on Patentability (Chapter I of the Patent Cooperation Treaty) in International application No. PCT/CN2022/117545, issued on Apr. 2, 2024.

"Further discussion on multi beam enhancement," 3GPP TSG RAN WG1 #105-e, R1-2104343, vivo, May 10-27, 2021, May 11, 2021.

Extended European Search Report from EP patent application No. 22874592.3 mailed Apr. 1, 2025.

* cited by examiner

BEAM MEASUREMENT METHOD AND APPARATUS, MEASUREMENT CONFIGURATION METHOD AND APPARATUS, TERMINAL AND NETWORK DEVICE

CROSS-REFERENCE TO RELATED APPLICATIONS

This application is the U.S. national phase of PCT Application No. PCT/CN2022/117545 filed on Sep. 7, 2022, which claims a priority to Chinese Patent Application No. 202111162619.9 filed in China on Sep. 30, 2021, the disclosures of which are incorporated by reference herein in their entireties.

TECHNICAL FIELD

The present disclosure relates to the field of communications technology, in particular to a beam measurement method and apparatus, a measurement configuration method and apparatus, a terminal and a network device.

BACKGROUND

In related technologies, in mobility measurement, a base station configures a beam measurement procedure through radio resource control (Radio Resource Control, RRC) for a terminal to perform measurement, and after receiving the measurement configuration, the terminal performs measurement according to the measurement configuration and obtains a measurement result. In a case where the terminal uses an event-triggered manner to report the measurement result, the terminal determines whether an event-triggered condition is satisfied according to the measurement result. The event-triggered condition is configured by the base station for the terminal. When the terminal detects that the measurement result satisfies the event-triggered condition, the terminal reports the measurement result. However, the beam measurement reporting in the mobility measurement in the related technologies is performed at layer 3 (L3), and has a relatively large delay, which is not suitable for beam management in a fast movement scenario.

SUMMARY

The present disclosure provides a beam measurement method and apparatus, a measurement configuration method and apparatus, a terminal and a network device, so as to solve problems in the related technologies that beam measurement reporting in the mobility measurement has a relatively large delay and is not suitable for beam management in a fast movement scenario.

An embodiment of the present disclosure provides a beam measurement method, which includes:

receiving, by a terminal, resource configuration information for beam measurement transmitted by a network device, where the resource configuration information includes beam measurement resources and first information; and performing, by the terminal, beam measurement according to the beam measurement resources and the first information, where the first information includes at least one of the following:

a parameter of a physical cell identifier list;

indication information associated with physical cell identifiers (Physical Cell Identifier, PCI); or first indexes of the beam measurement resources, where the first indexes implicitly indicate physical cell identifiers.

Optionally, the performing, by the terminal, beam measurement according to the beam measurement resources and the first information includes:

determining, by the terminal, cells for beam measurement based on the parameter of the physical cell identifier list; and performing, by the terminal, beam measurement for the cells on the beam measurement resources.

Optionally, the performing, by the terminal, beam measurement according to the beam measurement resources and the first information includes:

determining, by the terminal, cells for beam measurement corresponding to the beam measurement resources, based on the beam measurement resources and the indication information associated with the physical cell identifiers and corresponding to the beam measurement resources; and performing, by the terminal, beam measurement for the cells on the beam measurement resources.

Optionally, the beam measurement method further includes: receiving, by the terminal, a first medium access control control element (MAC-CE) signaling transmitted by the network device, where the first MAC-CE signaling carries a mapping relationship between the indication information associated with the physical cell identifiers and the physical cell identifiers;

where the performing, by the terminal, beam measurement according to the beam measurement resources and the first information includes: determining, by the terminal, cells for beam measurement corresponding to the beam measurement resources based on the mapping relationship between the indication information and the physical cell identifiers; and performing, by the terminal, beam measurement for the cells on the beam measurement resources.

Optionally, the beam measurement method further includes: receiving, by the terminal, a first radio resource control (RRC) signaling transmitted by the network device; and/or, receiving, by the terminal, a second MAC-CE signaling transmitted by the network device, where the first RRC signaling is used to configure a mapping relationship between the indication information and the physical cell identifiers, and the second MAC-CE signaling is used to update the mapping relationship between the indication information and the physical cell identifiers;

where the performing, by the terminal, beam measurement according to the beam measurement resources and the first information includes: determining, by the terminal, cells for beam measurement corresponding to the beam measurement resources based on the first RRC signaling, and performing beam measurement for the cells on the beam measurement resources; or, determining, by the terminal, cells for beam measurement corresponding to the beam measurement resources based on the second RRC signaling, and performing beam measurement for the cells on the beam measurement resources.

Optionally, the performing, by the terminal, beam measurement according to the beam measurement resources and the first information includes:

determining, by the terminal, a beam measurement resource corresponding to each of the physical cell identifiers based on the first indexes of the beam measurement resources; and performing, by the terminal, beam measurement for a target cell on the beam measurement resource corresponding to the target cell corresponding to each of the physical cell identifiers.

Optionally, the beam measurement method further includes: determining, by the terminal, second indexes corresponding to the physical cell identifiers based on a rule predefined by a system; and transmitting, by the terminal to the network device, beam measurement results of physical cells corresponding to the second indexes.

Optionally, the beam measurement method further includes:

receiving, by the terminal, configuration information of a beam measurement report transmitted by the network device; and transmitting, by the terminal to the network device, a beam measurement result obtained from the beam measurement based on the configuration information of the beam measurement report, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of event-triggered beam measurement result reporting includes at least one of the following:

an interval between measurement reporting times when an event triggers reporting;

the quantity of beam measurement reports when an event triggers reporting;

a reporting amount when an event triggers reporting; or the maximum quantity of reported cells supported by event-triggered reporting.

Optionally, in a case where the configuration information of the beam measurement report includes the offset of the parameter value for which the trigger event occurs, the transmitting, by the terminal to the network device, the beam measurement result obtained from the beam measurement includes:

determining a difference between a beam quality of a neighboring cell and a beam quality of a serving cell based on the beam measurement result obtained from the beam measurement; and transmitting, by the terminal to the network device, the beam measurement result obtained from the beam measurement, in a case where the difference is greater than the offset of the parameter value for which the trigger event occurs.

Optionally, the transmitting, to the network device, the beam measurement result obtained from the beam measurement includes at least one of the following:

transmitting uplink control information (UCI) to the network device, where the UCI carries the beam measurement result;

transmitting a third MAC-CE signaling to the network device, where the third MAC-CE signaling carries the beam measurement result;

transmitting the beam measurement result to the network device through an uplink channel of a configured grant reserved by the network device;

transmitting the beam measurement result to the network device through an uplink channel of contention free random access (CFRA); or transmitting the beam measurement result to the network device through an uplink channel of contention based random access (CBRA).

An embodiment of the present disclosure further provides a measurement configuration method, which includes:

transmitting, by a network device, resource configuration information for beam measurement to a terminal, where the resource allocation information includes beam measurement resources and first information; where the first information includes at least one of the following:

a parameter of a physical cell identifier list;

indication information associated with physical cell identifiers; or first indexes of the beam measurement resources, where the first indexes implicitly indicate physical cell identifiers.

Optionally, the measurement configuration method further includes: transmitting, by the network device, a first medium access control control element (MAC-CE) signaling to the terminal, where the first MAC-CE signaling carries a mapping relationship between the indication information and the physical cell identifiers.

Optionally, the measurement configuration method further includes:

transmitting, by the network device, a first radio resource control (RRC) signaling to the terminal, where the first RRC signaling is used to configure the mapping relationship between the indication information and the physical cell identifiers; and/or, transmitting, by the network device, a second MAC-CE signaling to the terminal, where the second MAC-CE signaling is used to update the mapping relationship between the indication information and the physical cell identifiers.

Optionally, the transmitting, by the network device, the resource configuration information for beam measurement to the terminal includes: transmitting, by the network device, a second RRC signaling to the terminal, where the second RRC signaling carries the beam measurement resources and the indication information corresponding to the beam measurement resources.

Optionally, the transmitting, by the network device, the resource configuration information for beam measurement to the terminal includes: transmitting, by the network device, a third RRC signaling to the terminal, where the third RRC signaling carries the beam measurement resources and the parameter of the physical cell identifier list.

Optionally, the measurement configuration method further includes: transmitting, by the network device, configuration information of a beam measurement report to the terminal, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of the event-triggered beam measurement result reporting includes at least one of the following:

an interval between measurement reporting times when an event triggers reporting;

the quantity of beam measurement reports when an event triggers reporting;

a reporting amount when an event triggers reporting;

the maximum quantity of reported cells supported by event-triggered reporting.

Optionally, the measurement configuration method further includes: receiving, by the network device, a beam measurement result transmitted by the terminal, where the beam measurement result is obtained by the terminal through the beam measurement based on the resource configuration information.

Optionally, the receiving, by the network device, the beam measurement result transmitted by the terminal includes at least one of the following:

receiving, by the network device, uplink control information (UCI) transmitted by the terminal, where the UCI carries the beam measurement result;

receiving, by the network device, a third MAC-CE signaling transmitted by the terminal, where the third MAC-CE signaling carries the beam measurement result;

receiving, by the network device, the beam measurement result transmitted by the terminal through an uplink channel of a configured grant reserved by the network device;

receiving, by the network device, the beam measurement result transmitted by the terminal through an uplink channel of contention free random access (CFRA); or receiving, by the network device, the beam measurement result transmitted by the terminal through an uplink channel of contention based random access (CBRA).

An embodiment of the present disclosure further provides a beam measurement apparatus, which includes a memory, a transceiver and a processor. The memory is configured to store a computer program; the transceiver is configured to transmit and receive data under the control of the processor; the processor is configured to read the computer program in the memory to perform the following operations:

receiving resource configuration information for beam measurement transmitted by a network device, where the resource configuration information includes beam measurement resources and first information; and performing a beam measurement according to the beam measurement resources and the first information, where the first information includes at least one of the following:

a parameter of a physical cell identifier list;

indication information associated with physical cell identifiers; or first indexes of the beam measurement resources, where the first indexes implicitly indicate physical cell identifiers.

Optionally, the processor is configured to read the computer program in the memory to perform the following operations:

determining cells for beam measurement based on the parameter of the physical cell identifier list; and performing beam measurement for the cells on the beam measurement resources.

Optionally, the processor is configured to read the computer program in the memory to perform the following operations:

determining cells for beam measurement corresponding to the beam measurement resources, based on the beam measurement resources and the indication information associated with the physical cell identifiers and corresponding to the beam measurement resources; and performing beam measurement for the cells on the beam measurement resources.

Optionally, the processor is configured to read the computer program in the memory to perform the following operations:

receiving a first medium access control control element (MAC-CE) signaling transmitted by the network device, where the first MAC-CE signaling carries a mapping relationship between the indication information associated with the physical cell identifiers and the physical cell identifiers;

determining cells for beam measurement corresponding to the beam measurement resources based on the mapping relationship between the indication information and the physical cell identifiers; and performing beam measurement for the cells on the beam measurement resources.

Optionally, the processor is configured to read the computer program in the memory to perform the following operations:

receiving a first radio resource control (RRC) signaling transmitted by the network device; and/or, receiving a second MAC-CE signaling transmitted by the network device, where the first RRC signaling is used to configure a mapping relationship between the indication information and the physical cell identifiers, and the second MAC-CE signaling is used to update the mapping relationship between the indication information and the physical cell identifiers; and determining cells for beam measurement corresponding to the beam measurement resources based on the first RRC signaling, and performing beam measurement for the cells on the beam measurement resources; or, determining cells for beam measurement corresponding to the beam measurement resources based on the second RRC signaling, and performing beam measurement for the cells on the beam measurement resources.

Optionally, the processor is configured to read the computer program in the memory to perform the following operations:

determining a beam measurement resource corresponding to each of the physical cell identifiers based on the first indexes of the beam measurement resources; and performing beam measurement for a target cell on the beam measurement resource corresponding to the target cell corresponding to each of the physical cell identifiers.

Optionally, the processor is configured to read the computer program in the memory to perform the following operations:

determining second indexes corresponding to the physical cell identifiers based on a rule predefined by a system; and transmitting, to the network device, beam measurement results of physical cells corresponding to the second indexes.

Optionally, the processor is configured to read the computer program in the memory to perform the following operations:

receiving configuration information of a beam measurement report transmitted by the network device; and transmitting, to the network device, a beam measurement result obtained from the beam measurement based on the configuration information of the beam measurement report, where the configuration information of the beam measurement report includes at least one of the following:

event-triggered beam measurement result reporting;

an offset of a parameter value for which a trigger event occurs; or relevant information of event-triggered beam measurement result reporting.

Optionally, the processor is configured to read the computer program in the memory to perform the following operations:

determining a difference between a beam quality of a neighboring cell and a beam quality of a serving cell based on the beam measurement result obtained from the beam measurement; and transmitting, to the network device, the beam measurement result obtained from the beam measurement, in a case where the difference is greater than the offset of the parameter value for which the trigger event occurs.

Optionally, the processor is configured to read the computer program in the memory and perform at least one of the following operations:

transmitting uplink control information (UCI) to the network device, where the UCI carries the beam measurement result;

transmitting a third MAC-CE signaling to the network device, where the third MAC-CE signaling carries the beam measurement result;

transmitting the beam measurement result to the network device through an uplink channel of a configured grant reserved by the network device;

transmitting the beam measurement result to the network device through an uplink channel of contention free random access (CFRA); or transmitting the beam measurement result to the network device through an uplink channel of contention based random access (CBRA).

An embodiment of the present disclosure further provides a terminal, which includes:

a first receiving unit, configured to receive resource configuration information for beam measurement transmitted by a network device, where the resource configuration information includes beam measurement resources and first information; and a first measurement unit, configured to perform beam measurement according to the beam measurement resources and the first information, where the first information includes at least one of the following:

a parameter of a physical cell identifier list;

indication information associated with physical cell identifiers; or first indexes of the beam measurement resources, where the first indexes implicitly indicate physical cell identifiers.

Optionally, the first measurement unit is further configured to:

determine cells for beam measurement based on the parameter of the physical cell identifier list; and perform beam measurement for the cells on the beam measurement resources.

Optionally, the first measurement unit is further configured to:

determine cells for beam measurement corresponding to the beam measurement resources, based on the beam measurement resources and the indication information corresponding to the beam measurement resources; and perform beam measurement for the cells on the beam measurement resources.

Optionally, the terminal further includes: a second receiving unit, configured to receive a first medium access control control element (MAC-CE) signaling transmitted by the network device, where the first MAC-CE signaling carries a mapping relationship between the indication information associated with the physical cell identifiers and the physical cell identifiers; the first measurement unit is further configured to: determine cells for beam measurement corresponding to the beam measurement resources based on the mapping relationship between the indication information and the physical cell identifiers; and perform beam measurement for the cells on the beam measurement resources.

Optionally, the terminal further includes: a third receiving unit, configured to receive a first radio resource control (RRC) signaling transmitted by the network device; and/or, receive a second MAC-CE signaling transmitted by the network device, where the first RRC signaling is used to configure a mapping relationship between the indication information and the physical cell identifiers, and the second MAC-CE signaling is used to update the mapping relationship between the indication information and the physical cell identifiers; the first measurement unit is further configured to: determine cells for beam measurement corresponding to the beam measurement resources based on the first RRC signaling, and perform beam measurement for the cells on the beam measurement resources; or, determine cells for beam measurement corresponding to the beam measurement resources based on the second RRC signaling, and perform beam measurement for the cells on the beam measurement resources.

Optionally, the first measurement unit is further configured to:

determine a beam measurement resource corresponding to each of the physical cell identifiers based on the first indexes of the beam measurement resources; and perform beam measurement for a target cell on the beam measurement resource corresponding to the target cell corresponding to each of the physical cell identifiers.

Optionally, the terminal further includes:

a second determining unit, configured to determine second indexes corresponding to the physical cell identifiers based on a rule predefined by a system; and a first transmission unit, configured for the terminal to transmit beam measurement results of physical cells corresponding to the second indexes.

Optionally, the terminal further includes:

a third receiving unit, configured to receive configuration information of a beam measurement report transmitted by the network device; and a second transmitting unit, configured to transmit a beam measurement result obtained from the beam measurement based on the configuration information of the beam measurement report, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of event-triggered beam measurement result reporting includes at least one of the following:

an interval between measurement reporting times when an event triggers reporting;

the quantity of beam measurement reports when an event triggers reporting;

a reporting amount when an event triggers reporting; or the maximum quantity of reported cells supported by event-triggered reporting.

Optionally, in a case where the configuration information of the beam measurement report includes the offset of the parameter value for which the trigger event occurs, the second transmitting unit is further configured to:

determine a difference between a beam quality of a neighboring cell and a beam quality of a serving cell based on the beam measurement result obtained from the beam measurement; and transmit, from the terminal to the network device, the beam measurement result obtained from the beam measurement, in a case where the difference is greater than the offset of the parameter value for which the trigger event occurs.

Optionally, the second transmitting unit is further configured to perform at least one of the following:

transmitting uplink control information (UCI) to the network device, where the UCI carries the beam measurement result;

transmitting a third MAC-CE signaling to the network device, where the third MAC-CE signaling carries the beam measurement result;

transmitting the beam measurement result to the network device through an uplink channel of a configured grant reserved by the network device;

transmitting the beam measurement result to the network device through an uplink channel of contention free random access (CFRA); or transmitting the beam measurement result to the network device through an uplink channel of contention based random access (CBRA).

An embodiment of the present disclosure further provides a measurement configuration apparatus, including a memory, a transceiver and a processor. The memory is configured to store a computer program; the transceiver is configured to transmit and receive data under the control of the processor; the processor is configured to read the computer program in the memory to perform the following operations:

transmitting resource configuration information for beam measurement to a terminal, where the resource allocation information includes beam measurement resources and first information; where the first information includes at least one of the following:

a parameter of a physical cell identifier list;

indication information associated with physical cell identifiers; or first indexes of the beam measurement resources, where the first indexes implicitly indicate physical cell identifiers.

Optionally, the processor is configured to read the computer program in the memory to perform the following operations: transmitting a first medium access control control element (MAC-CE) signaling to the terminal, where the first MAC-CE signaling carries a mapping relationship between the indication information and the physical cell identifiers.

Optionally, the processor is configured to read the computer program in the memory to perform the following operations:

transmitting a first radio resource control (RRC) signaling to the terminal, where the first RRC signaling is used to configure the mapping relationship between the indication information and the physical cell identifiers; and/or, transmitting a second MAC-CE signaling to the terminal, where the second MAC-CE signaling is used to update the mapping relationship between the indication information and the physical cell identifiers.

Optionally, the processor is configured to read the computer program in the memory to perform the following operations: transmitting a second RRC signaling to the terminal, where the second RRC signaling carries the beam measurement resources and the indication information corresponding to the beam measurement resources.

Optionally, the processor is configured to read the computer program in the memory to perform the following operations: transmitting a third RRC signaling to the terminal, where the third RRC signaling carries the beam measurement resources and the parameter of the physical cell identifier list.

Optionally, the processor is configured to read the computer program in the memory to perform the following operations: transmitting configuration information of a beam measurement report to the terminal, where the configuration information of the beam measurement report includes at least one of the following:

event-triggered beam measurement result reporting;

an offset of a parameter value for which a trigger event occurs; or relevant information of event-triggered beam measurement result reporting.

An embodiment of the present disclosure further provides a network device, which includes: a first transmitting unit, configured to transmit resource configuration information for beam measurement to a terminal, where the resource allocation information includes beam measurement resources and first information; the first information includes at least one of the following:

a parameter of a physical cell identifier list;

indication information associated with physical cell identifiers; or first indexes of the beam measurement resources, where the first indexes implicitly indicate physical cell identifiers.

Optionally, the network device further includes: a second transmitting unit, configured to transmit a first medium access control control element (MAC-CE) signaling to the terminal, where the first MAC-CE signaling carries a mapping relationship between the indication information and the physical cell identifiers.

Optionally, the network device further includes:

a third transmitting unit configured to transmit a first radio resource control (RRC) signaling to the terminal, where the first RRC signaling is used to configure the mapping relationship between the indication information and the physical cell identifiers; and/or, a fourth transmitting unit, configured to transmit a second MAC-CE signaling to the terminal, where the second MAC-CE signaling is used to update the mapping relationship between the indication information and the physical cell identifiers.

Optionally, the first transmitting unit is further configured to: transmit a second RRC signaling to the terminal, where the second RRC signaling carries the beam measurement resources and the indication information corresponding to the beam measurement resources.

Optionally, the first transmitting unit is further configured to: transmit a third RRC signaling to the terminal, where the third RRC signaling carries the beam measurement resources and the parameter of the physical cell identifier list.

Optionally, the network device further includes: a fifth transmitting unit, configured to transmit configuration information of a beam measurement report to the terminal, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of the event-triggered beam measurement result reporting includes at least one of the following:

an interval between measurement reporting times when an event triggers reporting;

the quantity of beam measurement reports when an event triggers reporting;

a reporting amount when an event triggers reporting;

the maximum quantity of reported cells supported by event-triggered reporting.

Optionally, the network device further includes: a receiving unit, configured to receive a beam measurement result transmitted by the terminal, where the beam measurement result is obtained by the terminal through the beam measurement based on the resource configuration information.

Optionally, the receiving unit is further configured to perform at least one of the following:

receiving uplink control information (UCI) transmitted by the terminal, where the UCI carries the beam measurement result;

receiving a third MAC-CE signaling transmitted by the terminal, where the third MAC-CE signaling carries the beam measurement result;

receiving the beam measurement result transmitted by the terminal through an uplink channel of a configured grant reserved by the network device;

receiving the beam measurement result transmitted by the terminal through an uplink channel of contention free random access (CFRA); or receiving the beam measurement result transmitted by the terminal through an uplink channel of contention based random access (CBRA).

An embodiment of the present disclosure further provides a processor readable storage medium. The processor readable storage medium stores a computer program, the computer program is configured to be executed by a processor to perform steps in the above beam measurement method; or, the computer program is configured to be executed by the processor to perform steps in the above measurement configuration method.

The above technical solutions of the present disclosure has the beneficial effects as following. In the above solutions, a terminal receives resource configuration information for beam measurement transmitted by a network device, and the resource configuration information includes beam measurement resources and first information; the terminal performs beam measurement according to the beam measurement resources and the first information. The first information includes a parameter of a physical cell identifier list, indication information associated with physical cell identifiers, and first indexes of the beam measurement resources, and the first indexes implicitly indicate the physical cell identifiers, thereby realizing a beam measurement of layer 1 (L1)/layer 2 (L2) inter-cell beam management, so as to solve a problem that beam measurement reporting in the existing mobility measurement has a relatively large delay, and it is not suitable for the beam management in a fast moving scenario.

DETAILED DESCRIPTION

Figure 1:
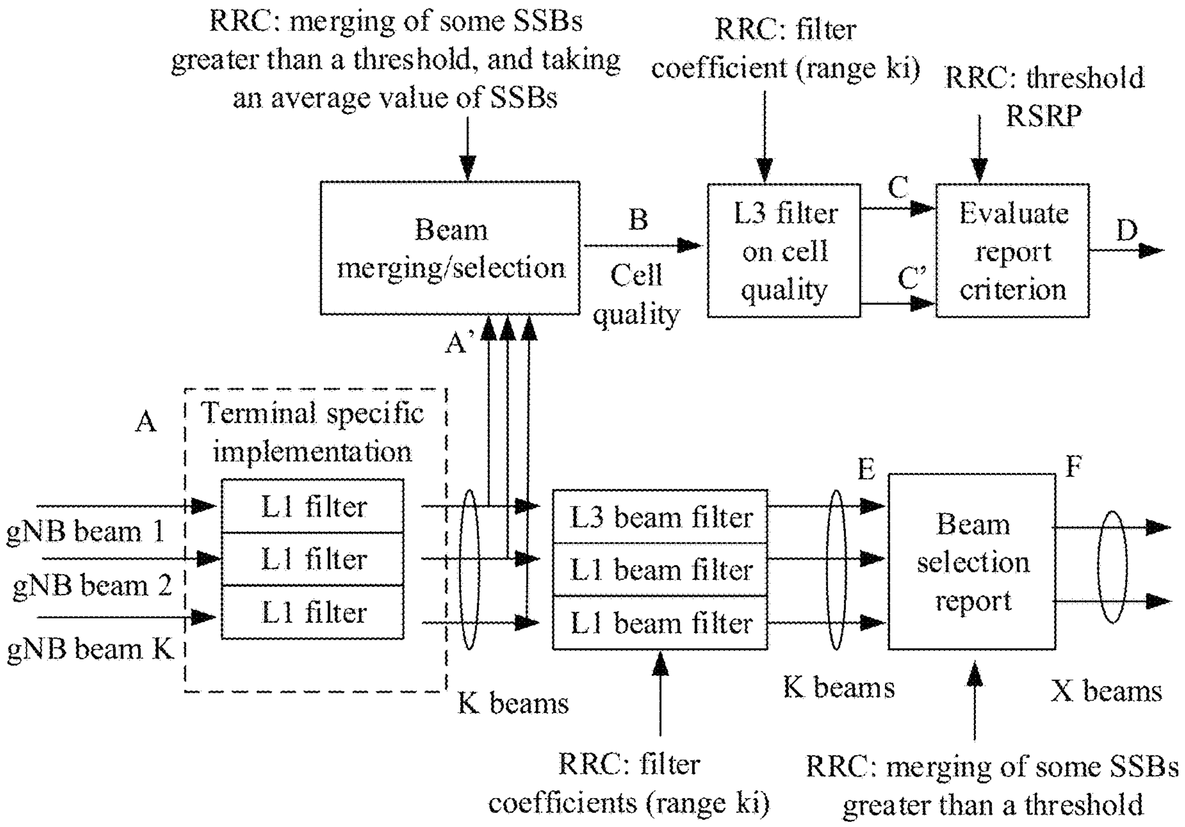
FIG. 1 shows a schematic diagram of a mobile measurement model.

In order to make a to-be-solved technical problem, a technical solution and advantages of the present disclosure clearer, a detailed description will be given below in conjunction with the accompanying drawings and specific embodiments. In the following description, specific details such as specific configurations and components are provided merely to assist in a comprehensive understanding of the embodiments of the present disclosure. Therefore, those skilled in the art should be appreciated that various changes and modifications can be made to the embodiments described herein without departing from the scope and spirit of the present disclosure. In addition, for clarity and conciseness, descriptions of known functions and constructions are omitted.

It should be appreciated that "an embodiment" or "one embodiment" mentioned throughout the specification means that specific features, structures, or characteristics related to the embodiment are included in at least one embodiment of the present disclosure. Therefore, expressions "in an embodiment" or "in one embodiment" appearing throughout the entire specification may not necessarily refer to the same embodiment. In addition, these specific features, structures, or characteristics can be combined in one or more embodiments in any suitable manner.

In various embodiments of the present disclosure, it should be appreciated that the size of a sequence quantity of each of the following processes does not imply the order execution, and the execution order of each process should be determined based on the function and internal logic of the each process, which should not constitute any limitations on the implementation process of the present disclosure.

Additionally, the terms "system" and "network" are often used interchangeably herein.

The technical solution according to embodiments of the present application may be applied to various systems, particularly to a 5G system. For example, an applicable system may be a global system of mobile communication (global system of mobile communication, GSM) system, a code division multiple access (code division multiple access, CDMA) system, a wideband code division multiple access (Wideband Code Division Multiple Access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a long term evolution advanced (long term evolution advanced, LTE-A) system, a universal mobile telecommunication system (universal mobile telecommunication system, UMTS), a worldwide interoperability for microwave access (worldwide interoperability for microwave access, WiMAX) system, and a 5G New Radio (New Radio, NR) system. Each of the various systems includes a terminal and a network device. The systems may further include a core network portion, such as an evolved packet system (Evolved Packet System, EPS), or a 5G system (5GS).

The network device and the terminal may each perform multi-input multi-output (Multi Input Multi Output, MIMO) transmission with each other by using one or more antennas. The MIMO transmission may be single user MIMO (Single User MIMO, SU-MIMO) or multiple user MIMO (Multiple User MIMO, MU-MIMO). According to the configuration and quantity of antenna combinations, the MIMO transmission may be 2 dimensional-MIMO (2 Dimensional MIMO, 2D-MIMO), 3 dimensional-MIMO (3 Dimensional MIMO, 3D-MIMO), full dimensional-MIMO (Full Dimensional MIMO, FD-MIMO) or massive-MIMO (massive-MIMO), and may be diversity transmission, pre-coded transmission, beam forming transmission, or the like.

The term "and/or" in the embodiments of the present disclosure describes an association relationship of associated objects, indicating that there may be three types of relationships. For example, A and/or B may represent three situations: A alone, both A and B, and B alone. The character "/" generally indicates that the associated objects before and after the character is in an "or" relationship.

The term "multiple" in the embodiments of the present application refers to two or more, and other quantifiers are similar thereto.

The technical solution of embodiments of the present application will be clearly and completely described hereinafter in conjunction with the accompanying drawings in the embodiments of the present application. Apparently, the described embodiments merely relate to a part of, rather than all of, the embodiments of the present application, and based on these embodiments of the present application, a person of ordinary skill in the art may obtain other embodiments without creative effort, which shall also fall within the scope of the present application.

The beam measurement reporting procedure in mobility measurement is as follows.

Step 1: a base station configures a terminal to perform measurement through an RRC signaling, and configured parameters include:

a) Measurement object (Measurement Object) provides reference signal information that needs to be measured by the terminal. The reference signal on which measurement may be performed is a synchronization signal and PBCH block (Synchronization Signal and PBCH block, SSB) and/or a periodic channel state information reference signal (Channel State Information Reference Signal, CSI-RS) of a single port.

b) Reporting configuration (Reporting configuration) indicates which measurement quantity the terminal needs to measure and report (such as reference signal received power (Reference Signal Received Power, RSRP), reference signal received quality (reference signal received quality, RSRQ) or signal-to-noise and interference ratio (signal-to-noise and interference ratio, SINR)). At the same time, it configures whether a reporting manner in which the terminal reports a measurement result is event-triggered or periodic reporting. A measurement identifier (measurement ID, measId) includes a pointer to associate a certain reporting configuration with the Measurement Object.

c) Quantity configuration (quantityConfig) indicates L3 filter coefficients for filtering the measurement. One measconfig at most includes two quantityConfigs.

For example, a base station notifies a terminal through measObject under an RRC parameter MeasObjectToAddMod that a reference signal for measurement is SSB, a frequency point is 504900, a subcarrier spacing of a subcarrier where this SSB is located is 30 KHz, a time window for measuring the SSB is defined as 5 subframes (subframe), a periodicity for the measurement is 20 ms, and an RRC parameter ReportConfigToAddMod includes two reportConfigs, namely reportConfigId 1 and reportConfigId 2. Under reportConfigId 1, the base station indicates that a measurement quantity that the terminal needs to report is RSRP, which is reported in an event-triggered manner, and an event-triggered condition is event A3 (event A3: Neighbor becomes amount of offset better than PCell/PSCell). The maximum quantity of reporting cells (maxReportCells) indicates that RSRP values of up to 3 cells can be reported. The time to trigger (timeToTrigger) instructs a terminal to perform RSRP reporting after 320 ms when the event A3 condition is satisfied. A time interval between two reports (reportinterval) is 1024 ms.

Step 2: after receiving the measurement configuration, the terminal performs measurement according to the measurement configuration to obtain a measurement result. The measurement model for obtaining a cell-level measurement result and a beam-level measurement result is shown in FIG. 1.

At point A, a terminal measures beams of a certain cell on a resource in an MO configured by a base station, to obtain measurement result beams (beam): beam 1, beam2, . . . , beam K. At point A1, the terminal performs layer 1 filtering on the measurement results obtained at point A, and then compares measured values after the layer 1 filtering with a certain threshold configured by the base station, to obtain a cell-level measurement result (point B). In a case where the RRC configures a threshold (Threshold) for beam selection, the maximum number N of beams is taken to obtain the cell-level measurement result, and qualities of n ($n<N$) beams detected by the UE are not lower than the configured threshold (Threshold), then the cell-level measurement result is equal to a linear average of measurement results corresponding to the n better beams that are higher than Threshold. If the quality of the best beam among the beams detected by the UE is lower than the configured threshold (Threshold), the cell-level measurement result is equal to a measurement result corresponding to the best beam among the beams detected by the UE. After point B, the terminal performs L3 filtering on the cell-level measurement result to obtain a signal quality of each cell (point C). The terminal compares the cell-level measurement result with a condition in a reporting criterion, and if the reporting criterion is met (for example Event A3: a measurement result of a neighboring cell becomes a certain amount (offset) better than that of a special cell (primary cell (Primary cell, PCell)/primary secondary cell (Primary secondary cell, PSCell)), the terminal performs cell-level measurement reporting.

Meanwhile, in a case where the terminal is configured to report a beam-level measurement result (IncludeBeamMeasurements included in reportConfig is true), the terminal needs to report a beam-level measurement result. As shown in the lower part of FIG. 2, after performing the L3 filtering on K beams measurement results in a certain cell (point E), the terminal selects X beams larger than a pre-configured threshold absThreshSS-BlocksConsolidation, and reports indexes (SSB resource indicator (SSB Resource Indicator, SSBRI)/CSI-RS resource indicator (CSI-RS Resource Indicator, CRI) of the beams, and corresponding beam qualities (RSRP/RSRQ/SINR) (point F in FIG. 2).

Step 3: in a case where the terminal uses the event-triggered manner to report a measurement result, the terminal determines whether an event-triggered condition is satisfied according to the measurement result. The event-triggered condition is configured by the base station to the terminal. When the terminal detects that the measurement result satisfies the event-triggered condition, for example, a RSRP value in a cell level is greater than a certain threshold for a period of time (TimeToTrigger), the terminal reports the measurement result. When reporting the measurement result, the terminal transmits a scheduling request (Scheduling Request, SR) to request an uplink resource. After receiving the scheduling request, the base station transmits an uplink grant (Uplink grant, UL grant) to allocate a physical uplink shared channel (Physical Uplink Shared Channel, PUSCH) resource. The terminal transmits the beam measurement result on a PUSCH resource indicated by the base station through the UL grant.

Since the beam measurement reporting in the current mobility measurement is performed at the L3 level, the delay thereof is relatively large, and it is not suitable for beam management in a fast moving scenario. Embodiments of the present application provide a beam measurement method and apparatus, a measurement configuration method and apparatus, a terminal and a network device, to solve the above problems.

The beam measurement method and apparatus, and the terminal are based on the same application concept, the beam configuration method and apparatus, and the network device are based on the same application concept, and the beam measurement method and the beam configuration method mentioned above are implemented by different executive bodies based on the same concept, principles for solving the problem are similar, so various embodiments can refer to each other, and the repeated parts will not be described.

Figure 2:
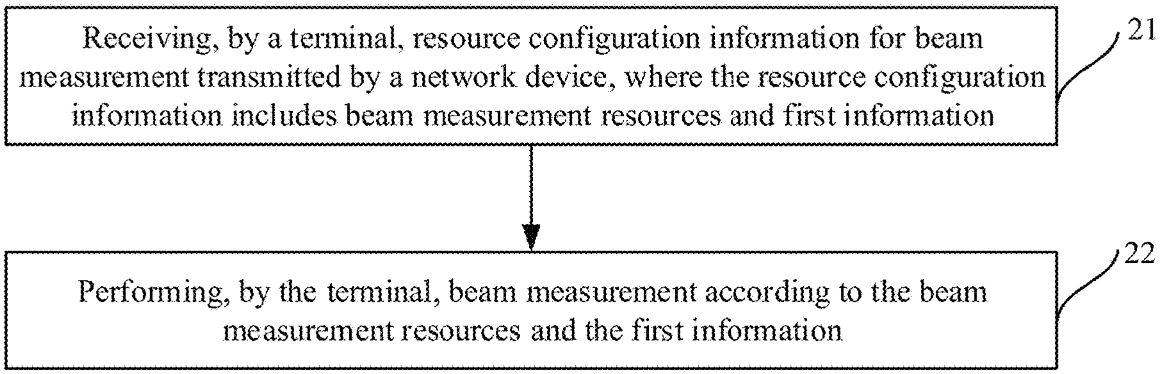
FIG. 2 shows a flow chart of a beam measurement method according to an embodiment of the present disclosure.

As shown in FIG. 2, an embodiment of the present disclosure provides a beam measurement method, which includes the following steps.

Step 21: receiving, by a terminal, resource configuration information for beam measurement transmitted by a network device, where the resource configuration information includes beam measurement resources and first information.

The first information includes at least one of the following:

a parameter of a physical cell identifier list;

indication information associated with physical cell identifiers; or first indexes of the beam measurement resources, where the first indexes implicitly indicate physical cell identifiers.

For example, in a case where the first information includes a parameter of a physical cell identifier list, the first information may instruct the terminal to perform beam measurement and beam quality evaluation for cells included in the parameter. For another example, in a case where the first information includes indication information (indicator) associated with physical cell identifiers, each beam measurement resource corresponds to one piece of indication information, that is, the indication information corresponding to the beam measurement resources implicitly indicates physical cell identifiers of cells for beam measurement. For another example, in a case where the first information includes first indexes of the beam measurement resources, the network device side and the terminal side can determine physical cell identifiers corresponding to the beam measurement resources based on a rule preset by the system, to determine cells for beam measurement, that is, the physical cell identifiers are implicitly indicated through the first indexes of the beam measurement resources.

Step 22: performing, by the terminal, beam measurement according to the beam measurement resources and the first information.

In the embodiment, a terminal receives resource configuration information for beam measurement transmitted by a network device, and the resource configuration information includes beam measurement resources and first information; the terminal performs beam measurement according to the beam measurement resources and the first information. The first information includes a parameter of a physical cell identifier list, indication information associated with physical cell identifiers, and first indexes of the beam measurement resources, and the first indexes implicitly indicate the physical cell identifiers, thereby realizing a beam measurement of L1/L2 inter-cell beam management, so as to solve a problem that beam measurement reporting in the existing mobility measurement has a relatively large delay, and it is not suitable for the beam management in a fast moving scenario.

Optionally, the step 21 may specifically include: receiving, by the terminal, a third RRC signaling transmitted by the network device, where the third RRC signaling carries the beam measurement resources and the parameter of the physical cell identifier list.

Optionally, the step 22 may specifically include: determining, by the terminal, cells for beam measurement based on the parameter of the physical cell identifier list; and performing, by the terminal, beam measurement for the cells on the beam measurement resources.

For example, the resource configuration information may be used to instruct the terminal to perform beam measurement and beam quality evaluation for a list of cells {PCI1, PCI2, PCI3} included in the parameter, and resources for beam measurement are a set of resources {SSB1, SSB2, SSB3, SSB4}. Then, the terminal performs measurement for beams in the list of cells {PCI1, PCI2, PCI3} on the measurement resources {SSB1, SSB2, SSB3, SSB4} according to the instructions from the base station.

Optionally, the step 21 may specifically include: receiving, by the terminal, a second RRC signaling transmitted by the network device, where the second RRC signaling carries the beam measurement resources, and the indication information corresponding to the beam measurement resources.

Optionally, the step 22 may specifically include: determining, by the terminal, cells for beam measurement corresponding to the beam measurement resources, based on the beam measurement resources and the indication information associated with the physical cell identifiers and corresponding to the beam measurement resources; and performing, by the terminal, beam measurement for the cells on the beam measurement resources.

For example, the resource configuration information is used to indicate, to the terminal, that a reference signal resource for performing beam measurement is a resource set {SSB1+indicator1, SSB2+indicator2, SSB3+indicator3, SSB4+indicator4}. Each SSB resource carries one piece of indication information (indicator), and the indicator is associated with a physical cell identifier. In this way, based on an association relationship between indicators and physical cell identifiers, a physical cell identifier associated with an indicator corresponding to each beam measurement resource can be determined, that is, to determine a physical cell identifier corresponding to each beam measurement resource. Thus, the terminal can perform beam measurement on a corresponding beam measurement resource for a beam measurement cell corresponding to each of the physical cell identifiers.

The association relationship (or referred to as mapping relationship) between indicators and physical cell identifiers may be configured and updated through first medium access control control element (Medium Access Control Control Element, MAC-CE) signaling.

Optionally, the beam measurement method further includes: receiving, by the terminal, a first medium access control control element (MAC-CE) signaling transmitted by the network device, where the first MAC-CE signaling carries a mapping relationship between the indication information associated with the physical cell identifiers and the physical cell identifiers;

the step 22 may specifically include: determining, by the terminal, cells for beam measurement corresponding to the beam measurement resources based on the mapping relationship between the indication information and the physical cell identifiers; and performing, by the terminal, beam measurement for the cells on the beam measurement resources.

For example, at time n, the network device may configure a mapping relationship between indicators and physical cell identifiers through a first MAC-CE signaling. In this way, the terminal may determine a physical cell identifier corresponding to each measurement resource according to the configured mapping relationship between indicators and physical cell identifiers, beam measurement resources configured by the network device, and indicators corresponding to the beam measurement resources, that is, to determine a physical cell identifier corresponding to each beam measurement resource. Thus, the terminal can perform, on a corresponding beam measurement resource, a beam measurement for a beam measurement cell corresponding to the physical cell identifier.

At time n+k, the network device may update the mapping relationship between indicators and physical cell identifiers through the first MAC-CE signaling. In this way, the terminal may determine a physical cell identifier corresponding to each measurement resource according to the updated mapping relationship between indicators and physical cell identifiers, beam measurement resources configured by the network device, and indicators corresponding to the beam measurement resources, that is, to determine a physical cell identifier corresponding to each beam measurement resource. Thus, the terminal can perform, on a corresponding beam measurement resource, a beam measurement for a beam measurement cell corresponding to the physical cell identifier.

The association relationship (or referred to as a mapping relationship) between indicators and physical cell identifiers may be configured through the first RRC signaling, and may be updated through the first MAC-CE signaling.

Optionally, the beam measurement method further includes: receiving, by the terminal, a first RRC signaling transmitted by the network device; and/or, receiving, by the terminal, a second MAC-CE signaling transmitted by the network device, where the first RRC signaling is used to configure a mapping relationship between the indication information and the physical cell identifiers, and the second MAC-CE signaling is used to update the mapping relationship between the indication information and the physical cell identifiers;

the step 22 may specifically include: determining, by the terminal, cells for beam measurement corresponding to the beam measurement resources based on the first RRC signaling, and performing beam measurement for the cells on the beam measurement resources; or, determining, by the terminal, cells for beam measurement corresponding to the beam measurement resources based on the second RRC signaling, and performing beam measurement for the cells on the beam measurement resources.

For example, at time n, the network device may configure a mapping relationship between indicators and physical cell identifiers through the first RRC signaling, so that the terminal may determine a physical cell identifier corresponding to each measurement resource according to the configured mapping relationship between indicators and physical cell identifiers, beam measurement resources configured by the network device, and indicators corresponding to the beam measurement resources, that is, to determine a physical cell identifier corresponding to each beam measurement resource. Thus, the terminal can perform a beam measurement on a corresponding beam measurement resource for a beam measurement cell corresponding to the physical cell identifier.

At time n+k, the network device may update the mapping relationship between indicators and physical cell identifiers through the second MAC-CE signaling, so that the terminal may determine a physical cell identifier corresponding to each measurement resource according to the updated mapping relationship between indicators and physical cell identifiers, beam measurement resources configured by the network device, and indicators corresponding to the beam measurement resources, that is, to determine a physical cell identifier corresponding to each beam measurement resource. Thus, the terminal can perform a beam measurement on a corresponding beam measurement resource for a beam measurement cell corresponding to the physical cell identifier.

Optionally, the step 21 may specifically include: receiving, by the terminal, a fourth RRC signaling transmitted by the network device, where the fourth RRC signaling carries the beam measurement resources and the first indexes of the beam measurement resources.

Optionally, the step 22 may specifically include:

determining, by the terminal, a beam measurement resource corresponding to each of the physical cell identifiers based on the first indexes of the beam measurement resources; and performing, by the terminal, beam measurement for a target cell on the beam measurement resource corresponding to the target cell corresponding to each of the physical cell identifiers.

Optionally, the method may further include:

determining, by the terminal, second indexes corresponding to the physical cell identifiers based on a rule predefined by a system; and transmitting, by the terminal to the network device, beam measurement results of physical cells corresponding to the second indexes.

For example, physical cell identifiers implicitly indicated by the first indexes are determined in a pre-defined or pre-configured manner by the system, so that the terminal can determine the beam measurement resources respectively corresponding to the physical cell identifiers according to the first indexes of the beam measurement resources, and can perform, on the corresponding beam measurement resources, beam measurement for cells corresponding to the physical cell identifiers. Further, the terminal re-encodes the beam measurement resources corresponding to the beam measurement cells based on a rule predefined by the system. That is, the terminal determines second indexes of the beam measurement resources respectively corresponding to the physical cell identifiers according to the rule predefined by the system, and reports beam measurement results to the network device based on the second indexes (that is, transmitting the beam measurement results corresponding to the second indexes to the network device). In this case, the network device side may also determine the second indexes of the beam measurement resources respectively corresponding to the physical cell identifiers, and may obtain corresponding beam measurement results based on the second indexes.

Optionally, the beam measurement method further includes: receiving, by the terminal, configuration information of a beam measurement report transmitted by the network device; and transmitting, by the terminal to the network device, a beam measurement result obtained from the beam measurement based on the configuration information of the beam measurement report.

The configuration information of the beam measurement report includes at least one of the following:

event-triggered beam measurement result reporting;

an offset of a parameter value for which a trigger event occurs; or relevant information of event-triggered beam measurement result reporting.

The event-triggered beam measurement result reporting may be understood as that the terminal reports a beam measurement result when an event trigger condition is satisfied. For example, the network device may configure CSI-ReportConfig through RRC, to instruct the terminal to report a beam measurement result by using an event-triggered beam measurement result reporting manner. The instruction method may include adding eventTriggered option into reportConfigType in CSI-ReportConfig.

The offset of the parameter value for which the trigger event occurs may be carried in high-layer signaling.

Optionally, in a case where the configuration information of the beam measurement report includes the offset of the parameter value for which the trigger event occurs, the transmitting, to the network device, the beam measurement result obtained from the beam measurement includes:

determining a difference between a beam quality of a neighboring cell and a beam quality of a serving cell based on the beam measurement result obtained from the beam measurement; and transmitting, by the terminal to the network device, the beam measurement result obtained from the beam measurement, in a case where the difference is greater than the offset of the parameter value for which the trigger event occurs.

Specifically, when the terminal performs beam measurement according to configuration of the network device, the terminal determines whether a beam measurement result meets a condition for a trigger event to occur, and if it meets the condition for the trigger event to occur, the terminal reports, to the network device, a beam measurement result obtained after the beam measurement. For example, a beam measurement result of a neighboring cell (such as a linear average value of measured L1-RSRP of a group of beams) becomes a certain offset (offset) better than that of a primary cell/serving cell. The value of this offset may be indicated by the network device to the terminal through high-level signaling, such as M-offset parameter included in the above-mentioned EventTriggerConfig.

The relevant information of event-triggered beam measurement result reporting includes at least one of the following: an interval between measurement reporting times when an event triggers reporting; the quantity of beam measurement reports when an event triggers reporting; a reporting amount when an event triggers reporting; or the maximum quantity of reported cells supported by event-triggered reporting.

Specifically, the terminal may transmits the beam measurement result obtained from the beam measurement to the network device, according to at least one of: the interval between times of measurement reports when an event triggers reporting; the quantity of beam measurement reports when an event triggers reporting; the reporting amount when an event triggers reporting; or the maximum quantity of reported cells supported by event-triggered reporting.

Optionally, the transmitting, by the terminal to the network device, the beam measurement result obtained from the beam measurement includes at least one of the following:

transmitting, by the terminal, uplink control information (Uplink Control Information, UCI) to the network device, where the UCI carries the beam measurement result; that is, transmitting a beam measurement report using UCI manner;

transmitting, by the terminal, a third MAC-CE signaling to the network device, where the third MAC-CE signaling carries the beam measurement result; that is, reporting the beam measurement result using MAC-CE manner;

transmitting, by the terminal, the beam measurement result to the network device through an uplink channel of a configured grant reserved by the network device; that is, transmitting a beam measurement report in a manner about UL Configured Grant;

transmitting, by the terminal, the beam measurement result to the network device through an uplink channel of contention free random access (Contention Free Random Access, CFRA); that is, reporting the beam measurement result using CFRA manner;

transmitting, by the terminal, the beam measurement result to the network device through an uplink channel of contention based random access (Physical Random Access Channel, CBRA), that is, reporting the beam measurement result using CBRA manner.

The transmitting, by the terminal, the UCI to the network device includes:

transmitting, by the terminal to the network device, a scheduling request (SR) for requesting allocation of an uplink resource; and receiving, by the terminal, an uplink grant (UL grant) transmitted by the network device, where the UL grant carries the uplink resource allocated by the network device to the terminal;

where in a case where the quantity of requested resources is carried in the SR, the quantity of the uplink resources is determined based on the quantity of the requested resources; in a case where the quantity of the requested resources is not carried in the SR, the quantity of the uplink resources is determined based on the maximum quantity of uplink resources required by the terminal for reporting.

Specifically, the terminal transmits an SR and the quantity of reports on a PUCCH, to request the base station to allocate uplink resources. The base station allocates uplink resources according to the request of the terminal and notifies the terminal of the allocated uplink resources through an UL grant. If the request of the terminal does not include the quantity of reports, the base station allocates uplink resources according to the maximum quantity of uplink resources required by the terminal for reporting.

Optionally, the transmitting, by the terminal, the third MAC-CE signaling to the network device includes: transmitting, by the terminal, the third MAC-CE signaling on a PUSCH resource, in a case where the PUSCH resource exists.

Specifically, similar to BFR MAC-CE reporting, a new MAC-CE may be defined, such as inter-cell beam management (Inter-Cell Beam Management, ICBM) MAC-CE. The terminal transmits an ICBM MAC-CE on the nearest available PUSCH resource. If the terminal cannot find such PUSCH resource, the terminal transmits an SR on a PUCCH, to request the base station to allocate uplink resources, and the base station allocates uplink resources according to the request of the terminal and transmits a UL grant to notify the terminal of the allocated uplink resources.

The transmitting, by the terminal, the beam measurement result to the network device through the CFRA/CBRA uplink channel may include: reporting the measurement result by using a physical random access channel (Physical Random Access Channel, PRACH), for example, reporting through message 3 (MSG3).

The terminal involved in the embodiments of the present application may be a device that provides voice and/or data connectivity to a user, a handheld device with a radio connection function, or other processing devices connected to a radio modem or the like. In different systems, the names of terminal may be different. For example, in a 5G system, a terminal may be referred to as user equipment (User Equipment, UE). A wireless terminal can communicate with one or more core networks (Core Network, CNs) via a radio access network (Radio Access Network, RAN), and the wireless terminal may be a mobile terminal, such as a mobile phone (or referred to as "cellular" phone) and a computer with a mobile terminal, such as a portable, pocket-sized, hand-held, computer built-in or vehicle-mounted mobile apparatus, which exchange voice and/or data with the radio access network. For example, personal communication service (Personal Communication Service, PCS) phones, cordless phones, session initiated protocol (Session Initiated Protocol, SIP) phones, wireless local loop (Wireless Local Loop, WLL) stations, personal digital assistant (Personal Digital Assistant, PDA) and other devices. The wireless terminal may also be referred to as a system, subscriber unit (subscriber unit), subscriber station (subscriber station), mobile station (mobile station), mobile (mobile), remote station (remote station), access point (access point), remote terminal (remote terminal), access terminal (access terminal), user terminal (user terminal), user agent (user agent) and user device (user device), which are not limited in the embodiments of the present application.

The beam measurement method of the present disclosure has been introduced in the above embodiments, and the corresponding terminals and apparatuses will be further described in the following embodiments in conjunction with the accompanying drawings.

Figure 3:
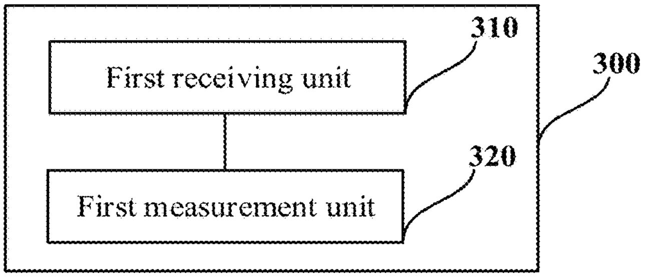
FIG. 3 shows a block diagram of a terminal according to an embodiment of the present disclosure.

Specifically, as shown in FIG. 3, an embodiment of the present disclosure provides a terminal 300, which includes:

a first receiving unit 310, configured to receive resource configuration information for beam measurement transmitted by a network device, where the resource configuration information includes beam measurement resources and first information; and a first measurement unit 320, configured to perform beam measurement according to the beam measurement resources and the first information, where the first information includes at least one of the following:

a parameter of a physical cell identifier list;

indication information associated with physical cell identifiers; or first indexes of the beam measurement resources, where the first indexes implicitly indicate physical cell identifiers.

Optionally, the first measurement unit 320 is further configured to:

determine cells for beam measurement based on the parameter of the physical cell identifier list; and perform beam measurement for the cells on the beam measurement resources.

Optionally, the first measurement unit 320 is further configured to:

determine cells for beam measurement corresponding to the beam measurement resources, based on the beam measurement resources and the indication information corresponding to the beam measurement resources and associated with the physical cell identifiers; and perform beam measurement for the cells on the beam measurement resources.

Optionally, the terminal 300 further includes: a second receiving unit, configured to receive a first medium access control control element (MAC-CE) signaling transmitted by the network device, where the first MAC-CE signaling carries a mapping relationship between the indication information associated with the physical cell identifiers and the physical cell identifiers;

the first measurement unit 320 is further configured to: determine cells for beam measurement corresponding to the beam measurement resources based on the mapping relationship between the indication information and the physical cell identifiers; and perform beam measurement for the cells on the beam measurement resources.

Optionally, the terminal 300 further includes: a third receiving unit, configured to receive a first radio resource control (RRC) signaling transmitted by the network device; and/or, receive a second MAC-CE signaling transmitted by the network device, where the first RRC signaling is used to configure a mapping relationship between the indication information and the physical cell identifiers, and the second MAC-CE signaling is used to update a mapping relationship between the indication information and the physical cell identifiers;

the first measurement unit 320 is further configured to: determine cells for beam measurement corresponding to the beam measurement resources based on the first RRC signaling, and perform beam measurement for the cells on the beam measurement resources; or, determine cells for beam measurement corresponding to the beam measurement resources based on the second RRC signaling, and perform beam measurement for the cells on the beam measurement resources.

Optionally, the first measurement unit 320 is further configured to: determine a beam measurement resource corresponding to each of the physical cell identifiers based on the first indexes of the beam measurement resources; and perform beam measurement for a target cell on the beam measurement resource corresponding to the target cell corresponding to each of the physical cell identifiers.

Optionally, the terminal 300 further includes:

a second determining unit, configured to determine second indexes corresponding to the physical cell identifiers based on a rule predefined by a system; and a first transmission unit, configured for the terminal to transmit beam measurement results of physical cells corresponding to the second indexes.

Optionally, the terminal 300 further includes:

a third receiving unit, configured to receive configuration information of a beam measurement report transmitted by the network device; and a second transmitting unit, configured to transmit a beam measurement result obtained from the beam measurement based on the configuration information of the beam measurement report, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of event-triggered beam measurement result reporting includes at least one of the following:

an interval between measurement reporting times when an event triggers reporting;

the quantity of beam measurement reports when an event triggers reporting;

a reporting amount when an event triggers reporting; or the maximum quantity of reported cells supported by event-triggered reporting.

Optionally, the first transmitting unit or the second transmitting unit is further configured to:

determine a difference between a beam quality of a neighboring cell and a beam quality of a serving cell based on the beam measurement result obtained from the beam measurement; and transmit, from the terminal to the network device, the beam measurement result obtained from the beam measurement, in a case where the difference is greater than the offset of the parameter value for which the trigger event occurs.

Optionally, the first transmitting unit or the second transmitting unit is further configured to at least one of the following:

transmitting uplink control information (UCI) to the network device, where the UCI carries the beam measurement result;

transmitting a third MAC-CE signaling to the network device, where the third MAC-CE signaling carries the beam measurement result;

transmitting the beam measurement result to the network device through an uplink channel of a configured grant reserved by the network device;

transmitting the beam measurement result to the network device through an uplink channel of contention free random access (CFRA); or transmitting the beam measurement result to the network device through an uplink channel of contention based random access (CBRA).

It should be noted that the division of units in the embodiments of the present application is illustrative, and is only a logical function division, and there may be another division manner in actual implementation. In addition, the functional units in various embodiments of the present application may be integrated into one processing unit, or each unit may exist separately physically, or two or more units may be integrated into one unit. The above-mentioned integrated units may be implemented in the form of hardware or in the form of software functional units.

If the function is implemented in the form of a software functional unit, and sold or used as a standalone product, it may be stored in a processor readable storage medium. Based on this understanding, essence of the technical solution of the present application, or the part contributing to the prior art, or part of the technical solution, may be embodied in the form of a software product. The computer software product is stored in a storage medium, and the software product includes a quantity of instructions to enable a computer device (which may be a personal computer, a server, or a network device, etc.) or a processor (processor) to perform all or part of the steps of method described in the various embodiments of the present application. The storage medium includes a universal serial bus (USB) flash drive, a mobile hard disk, a read-only memory (Read-Only Memory, ROM), a random access memory (Random Access Memory, RAM), a magnetic disk, an optical disk, and other medium which can store program codes.

It should be noted that the above terminal provided in the embodiment of the present disclosure can implement all method steps implemented in the above method embodiments, and can achieve the same technical effects. Therefore, the description and the beneficial effect of this embedment that are the same as the method embodiments will not be introduced here in detail.

Figure 4:
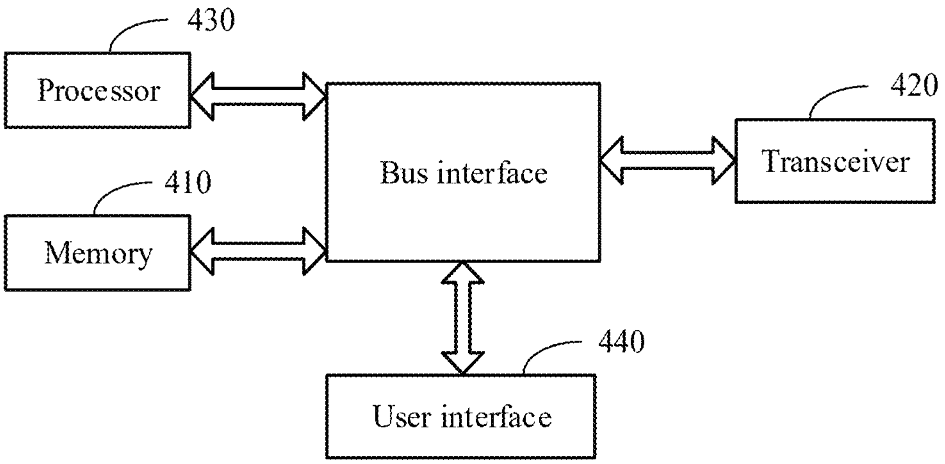
FIG. 4 shows a block diagram of a beam measurement apparatus according to an embodiment of the present disclosure.

In order to better achieve the above objective, as shown in FIG. 4, an embodiment of the present disclosure provides a beam measurement apparatus, which includes: a memory 410, a transceiver 420 and a processor 430. The memory 410 is configured to store a computer program. The transceiver 420 is configured to perform data transceiving under the control of the processor 430; for example, the transceiver 420 is configured to receive and transmit data under the control of the processor 430. The processor 430 is configured to read the computer program in the memory 410 to execute the following operations:

receiving resource configuration information for beam measurement transmitted by a network device, where the resource configuration information includes beam measurement resources and first information; and performing a beam measurement according to the beam measurement resources and the first information, where the first information includes at least one of the following:

a parameter of a physical cell identifier list;

indication information associated with physical cell identifiers; or first indexes of the beam measurement resources, where the first indexes implicitly indicate physical cell identifiers.

Optionally, the processor 430 is configured to read the computer program in the memory 410 to perform the following operations:

determining cells for beam measurement based on the parameter of the physical cell identifier list; and performing beam measurement for the cells on the beam measurement resources.

Optionally, the processor 430 is configured to read the computer program in the memory 410 to perform the following operations:

determining cells for beam measurement corresponding to the beam measurement resources, based on the beam measurement resources and the indication information associated with the physical cell identifiers and corresponding to the beam measurement resources; and performing beam measurement for the cells on the beam measurement resources.

Optionally, the processor 430 is configured to read the computer program in the memory 410 to perform the following operations:

receiving a first medium access control control element (MAC-CE) signaling transmitted by the network device, where the first MAC-CE signaling carries a mapping relationship between the indication information associated with the physical cell identifiers and the physical cell identifiers;

determining cells for beam measurement corresponding to the beam measurement resources based on the mapping relationship between the indication information and the physical cell identifiers; and performing beam measurement for the cells on the beam measurement resources.

Optionally, the processor 430 is configured to read the computer program in the memory 410 to perform the following operations:

receiving a first radio resource control (RRC) signaling transmitted by the network device; and/or, receiving, by the terminal, a second MAC-CE signaling transmitted by the network device, where the first RRC signaling is used to configure a mapping relationship between the indication information and the physical cell identifiers, and the second MAC-CE signaling is used to update the mapping relationship between the indication information and the physical cell identifiers; and determining cells for beam measurement corresponding to the beam measurement resources based on the first RRC signaling, and performing beam measurement for the cells on the beam measurement resources; or, determining cells for beam measurement corresponding to the beam measurement resources based on the second RRC signaling, and performing beam measurement for the cells on the beam measurement resources.

Optionally, the processor 430 is configured to read the computer program in the memory 410 to perform the following operations:

determining a beam measurement resource corresponding to each of the physical cell identifiers based on the first indexes of the beam measurement resources; and performing beam measurement for a target cell on the beam measurement resource corresponding to the target cell corresponding to each of the physical cell identifiers.

Optionally, the processor 430 is configured to read the computer program in the memory 410 to perform the following operations:

determining second indexes corresponding to the physical cell identifiers based on a rule predefined by a system; and transmitting, to the network device, beam measurement results of physical cells corresponding to the second indexes.

Optionally, the processor 430 is configured to read the computer program in the memory 410 to perform the following operations:

receiving configuration information of a beam measurement report transmitted by the network device; and transmitting, to the network device, a beam measurement result obtained from the beam measurement based on the configuration information of the beam measurement report, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of event-triggered beam measurement result reporting includes at least one of the following:

an interval between measurement reporting times when an event triggers reporting;

the quantity of beam measurement reports when an event triggers reporting;

a reporting amount when an event triggers reporting; or the maximum quantity of reported cells supported by event-triggered reporting.

Optionally, the processor 430 is configured to read the computer program in the memory 410 to perform the following operations:

determining a difference between a beam quality of a neighboring cell and a beam quality of a serving cell based on the beam measurement result obtained from the beam measurement; and transmitting, to the network device, the beam measurement result obtained from the beam measurement, in a case where the difference is greater than the offset of the parameter value for which the trigger event occurs.

Optionally, the processor 430 is configured to read the computer program in the memory 410 to perform at least one of the following operations:

transmitting uplink control information (UCI) to the network device, where the UCI carries the beam measurement result;

transmitting a third MAC-CE signaling to the network device, where the third MAC-CE signaling carries the beam measurement result;

transmitting the beam measurement result to the network device through an uplink channel of a configured grant reserved by the network device;

transmitting the beam measurement result to the network device through an uplink channel of contention free random access (CFRA); or transmitting the beam measurement result to the network device through an uplink channel of contention based random access (CBRA).

In FIG. 4, the bus architecture may include any quantity of interconnected buses and bridges. Specifically, various circuits of one or more processors represented by the processor 430 and a memory represented by the memory 410 are linked together. The bus architecture may also link various other circuits such as peripheral devices, voltage regulators, power management circuits, etc., which are well-known in the art, and therefore, no further descriptions are provided herein. The bus interface provides an interface. The transceiver 420 may be a plurality of elements, that is, include a transmitter and a receiver, and provide a unit for communicating with various other devices on transmission media. These transmission media include a wireless channel, a wired channel, an optical cable and other transmission media. For different user equipment, the user interface 440 may also be an interface capable of externally or internally connecting to required equipment. The connected equipment includes but not limited to a keypad, a display, a speaker, a microphone, a joystick, and the like.

The processor 430 is responsible for managing the bus architecture and general processing, and the memory 410 may store data used by the processor 430 when performing operations.

Optionally, the processor 430 may be a central processing unit (Central Processing Unit, CPU), an application specific integrated circuit (Application Specific Integrated Circuit, ASIC), a field-programmable gate array (Field-Programmable Gate Array, FPGA) or a complex programmable logic device (Complex Programmable Logic Device, CPLD). The processor may also adopt a multi-core architecture.

The processor is configured to execute any one of the methods provided in the embodiments of the present application according to the obtained executable instructions by invoking the computer program stored in the memory. The processor and the memory may also be physically separated.

It should be noted that the above apparatus provided in the embodiment of the present disclosure can implement all method steps implemented in the above method embodiments, and can achieve the same technical effects. Therefore, the description and the beneficial effect of this embedment that are the same as the method embodiments will not be introduced here in detail.

An embodiment of the present disclosure further provides a processor readable storage medium. The processor readable storage medium stores a computer program, and the computer program is configured to enable a processor to execute steps in the above-mentioned beam measurement method, and can achieve the same technical effects. Therefore, the description and the beneficial effect of this embedment that are the same as the method embodiments will not be introduced here in detail.

The processor readable storage medium may be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid state disk (SSD)), etc.

The beam measurement method of the embodiment of the present disclosure has been introduced above from the terminal side, and a measurement configuration method at the network device side will be further described below in conjunction with the accompanying drawings.

Figure 5:
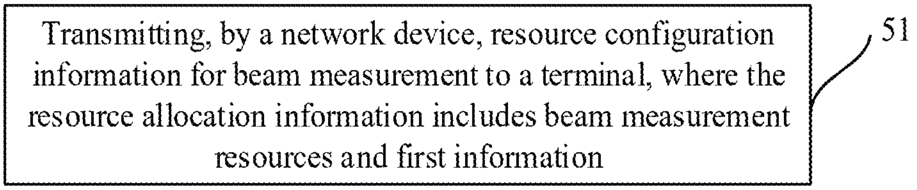
FIG. 5 shows a flow chart of a measurement configuration method according to an embodiment of the present disclosure.

As shown in FIG. 5, an embodiment of the present disclosure provides a measurement configuration method, which includes:

step 51: transmitting, by a network device, resource configuration information for beam measurement to a terminal, where the resource allocation information includes beam measurement resources and first information, where the first information includes at least one of the following:

a parameter of a physical cell identifier list;

indication information associated with physical cell identifiers; or first indexes of the beam measurement resources, where the first indexes implicitly indicate physical cell identifiers.

For example, the network device may configure CSI-ResourceConfig through RRC, to indicate reference signal resources (such as SSB/CSI-RS) for performing beam measurement by the terminal, and the first information.

In this embodiment, a network device transmits resource configuration information for beam measurement to a terminal, and the resource configuration information includes beam measurement resources and first information. The first information includes a parameter of a physical cell identifier list, indication information associated with physical cell identifiers, and first indexes of the beam measurement resources, and the first indexes implicitly indicate the physical cell identifiers. In this manner, the terminal performs beam measurement according to the beam measurement resources and the first information, thereby realizing a beam measurement of layer 1 (L1)/layer 2 (L2) inter-cell beam management, so as to solve a problem that beam measurement reporting in the existing mobility measurement has a relatively large delay, and it is not suitable for the beam management in a fast moving scenario.

Optionally, the measurement configuration method further includes: transmitting, by the network device, a first medium access control control element (MAC-CE) signaling to the terminal, where the first MAC-CE signaling carries a mapping relationship between the indication information and the physical cell identifiers.

Optionally, the measurement configuration method further includes:

transmitting, by the network device, a first radio resource control (RRC) signaling to the terminal, where the first RRC signaling is used to configure the mapping relationship between the indication information and the physical cell identifiers; and/or, transmitting, by the network device, a second MAC-CE signaling to the terminal, where the second MAC-CE signaling is used to update the mapping relationship between the indication information and the physical cell identifiers.

Optionally, the transmitting, by the network device, the resource configuration information for beam measurement to the terminal includes: transmitting, by the network device, a second RRC signaling to the terminal, where the second RRC signaling carries the beam measurement resources and the indication information corresponding to the beam measurement resources.

For example, in configuring the reference signal resources for measurement in the CSI-ResourceConfig through RRC signaling, each reference signal resource carries one indicator, and the indicator is associated with a physical cell ID. Furthermore, this association relation is configured and updated through MAC-CE; or is configured through RRC and is updated through MAC-CE.

Optionally, the transmitting, by the network device, the resource configuration information for beam measurement to the terminal includes: transmitting, by the network device, a third RRC signaling to the terminal, where the third RRC signaling carries the beam measurement resources and the parameter of the physical cell identifier list. For example, CSI-ResourceConfig is enabled to include the parameter of the physical cell list through RRC configuration, to instruct the terminal to perform measurement and beam quality evaluation on cells included in the parameter.

Optionally, the measurement configuration method further includes: transmitting, by the network device, configuration information of a beam measurement report to the terminal, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of the event-triggered beam measurement result reporting includes at least one of the following:

- an interval between measurement reporting times when an event triggers reporting;
- the quantity of beam measurement reports when an event triggers reporting;
- a reporting amount when an event triggers reporting;
- the maximum quantity of reported cells supported by event-triggered reporting.

For example, a network device may configure CSI-ReportConfig through RRC, to instruct a terminal to report a beam measurement result using an event-triggered manner for reporting the beam measurement result. The instruction method may include adding eventTriggered option into reportConfigType in CSI-ReportConfig. An example of the configuration manner is as follows:

```
reportConfigType                  CHOICE {
  ......
     periodic
   semiPersistentOnPUCCH
   semiPersistentOnPUSCH
   aperiodic
     eventTriggered                 EventTriggerConfig
     ......
     },
```

where the EventTriggerConfig may include the following information:

```
EventTriggerConfig::=                    SEQUENCE {
  eventId                           CHOICE {
    event M                           SEQUENCE {
      M-Offset                          MeasTriggerQuantityOffset,
      reportOnLeave                         BOOLEAN,
      hysteresis                          Hysteresis,
      timeToTrigger                         TimeToTrigger,
      useWhiteCellList                          BOOLEAN
    },
      ...
},
rsType                            NR-RS-Type,
reportInterval                        ReportInterval,
  reportAmount                              ENUMERATED {r1, r2, r4, r8, r16, r32, r64,
                                                infinity},
reportQuantityCell                      MeasReportQuantity,
maxReportCells                         INTEGER (1..maxCellReport),
  reportQuantityRS-Indexes                        MeasReportQuantity
        OPTIONAL,   -- Need R
maxNrofRS-IndexesToReport                   INTEGER (1..maxNrofIndexesToReport)
      OPTIONAL,    -- Need R
}
```

Optionally, the measurement configuration method further includes: receiving, by the network device, a beam measurement result transmitted by the terminal, where the beam measurement result is obtained by the terminal through the beam measurement based on the resource configuration information.

Optionally, the receiving, by the network device, the beam measurement result transmitted by the terminal includes at least one of the following:

- receiving, by the network device, uplink control information (UCI) transmitted by the terminal, where the UCI carries the beam measurement result;
- receiving, by the network device, a third MAC-CE signaling transmitted by the terminal, where the third MAC-CE signaling carries the beam measurement result;
- receiving, by the network device, the beam measurement result transmitted by the terminal through an uplink channel of a configured grant reserved by the network device;
- receiving, by the network device, the beam measurement result transmitted by the terminal through an uplink channel of contention free random access (CFRA); or
- receiving, by the network device, the beam measurement result transmitted by the terminal through an uplink channel of contention based random access (CBRA).

The network device involved in the embodiments of the present application may be a base station. The base station may include multiple cells that provide services to terminals. Depending on the specific application scenario, the base station may be called access point, or may be a device in the access network that communicates over an air interface with wireless terminal devices through one or more sectors, or may be called another name. The network device may be used for converting the received radio frames into Internet protocol (Internet Protocol, IP) packets or vice versa, and serves as a router between the wireless terminals and the rest of the access network. The rest of the access network may include an IP communication network. The network device may also coordinate the attribute management of the air interface. For example, the network device involved in the embodiments of the present application may be a base transceiver station (Base Transceiver Station, BTS) in the global system for mobile communications (Global System for Mobile communications, GSM) or code division multiple access (Code Division Multiple Access, CDMA), a NodeB in the wide-band code division multiple access (Wide-band Code Division Multiple Access, WCDMA), an evolved Node B (evolutional Node B, eNB or e-NodeB) in long term evolution (long term evolution, LTE) system, a 5G base station (gNB) in 5G network architecture (next generation system), a home evolved Node B (Home evolved Node B, HeNB), a relay node (relay node), a femto (femto), a pico (pico), or the like, which is not limited in the embodiments of the present application. In some network architectures, the network device may include a centralized unit (centralized unit, CU) node and a distributed unit (distributed unit, DU) node, which may be geographically separated.

The measurement configuration method of the present disclosure has been introduced in above embodiments, and a corresponding network device will be further described in the following embodiments in conjunction with the accompanying drawings.

Figure 6:
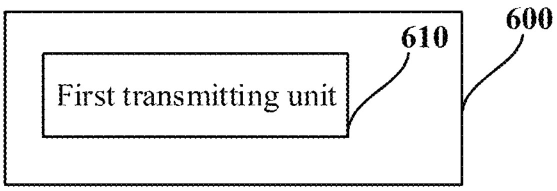
FIG. 6 shows a block diagram of a network device according to an embodiment of the present disclosure.

Specifically, as shown in FIG. 6, an embodiment of the present disclosure provides a network device 600, which includes: a first transmitting unit 610, configured to transmit resource configuration information for beam measurement to a terminal, where the resource allocation information includes beam measurement resources and first information; where the first information includes at least one of the following:

a parameter of a physical cell identifier list;

indication information associated with physical cell identifiers; or first indexes of the beam measurement resources, where the first indexes implicitly indicate physical cell identifiers.

Optionally, the network device 600 further includes: a second transmitting unit, configured to transmit second transmitting unit, configured to transmit a first medium access control control element (MAC-CE) signaling to the terminal, where the first MAC-CE signaling carries a mapping relationship between the indication information and the physical cell identifiers.

Optionally, the network device 600 further includes:

a third transmitting unit configured to transmit a first radio resource control (RRC) signaling to the terminal, where the first RRC signaling is used to configure a mapping relationship between the indication information and the physical cell identifiers; and/or, a fourth transmitting unit, configured to transmit a second MAC-CE signaling to the terminal, where the second MAC-CE signaling is used to update a mapping relationship between the indication information and the physical cell identifiers.

Optionally, the first transmitting unit 610 is further configured to: transmit a second RRC signaling to the terminal, where the second RRC signaling carries the beam measurement resources and the indication information corresponding to the beam measurement resources.

Optionally, the first transmitting unit 610 is further configured to: transmit a third RRC signaling to the terminal, where the third RRC signaling carries the beam measurement resources and the parameter of the physical cell identifier list.

Optionally, the network device 600 further includes: a fifth transmitting unit, configured to transmit configuration information of a beam measurement report to the terminal, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of the event-triggered beam measurement result reporting includes at least one of the following:

an interval between measurement reporting times when an event triggers reporting;

the quantity of beam measurement reports when an event triggers reporting;

a reporting amount when an event triggers reporting;

the maximum quantity of reported cells supported by event-triggered reporting.

Optionally, the network device 600 further includes: a receiving unit, configured to receive a beam measurement result transmitted by the terminal, where the beam measurement result is obtained by the terminal through the beam measurement based on the resource configuration information.

Optionally, the receiving unit is further configured to perform at least one of the following:

receiving, by the network device, uplink control information (UCI) transmitted by the terminal, where the UCI carries the beam measurement result;

receiving, by the network device, a third MAC-CE signaling transmitted by the terminal, where the third MAC-CE signaling carries the beam measurement result;

receiving, by the network device, the beam measurement result transmitted by the terminal through an uplink channel of a configured grant reserved by the network device;

receiving, by the network device, the beam measurement result transmitted by the terminal through an uplink channel of contention free random access (CFRA); or receiving, by the network device, the beam measurement result transmitted by the terminal through an uplink channel of contention based random access (CBRA).

It should be noted that the division of units in the embodiment of the present application is schematic, and is only a logical function division, and there may be another division manner in actual implementation. In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor readable storage medium. Based on this understanding, the technical solution of the present application is essentially or part of the contribution to the prior art or all or part of the technical solution can be embodied in the form of a software product, and the computer software product is stored in a storage medium, including several instructions to make a computer device (which may be a personal computer, a server, or a network device, etc.) or a processor (processor) execute all or part of the steps of the methods described in the various embodiments of the present application. The aforementioned storage medium includes: U disk, mobile hard disk, read-only memory (Read-Only Memory, ROM), random access memory (Random Access Memory, RAM), magnetic disk or optical disk and other various media that can store program codes.

It should be noted that the above network device provided in the embodiment of the present disclosure can implement all method steps implemented in the above method embodiments, and can achieve the same technical effects. Therefore, the description and the beneficial effect of this embedment that are the same as the method embodiments will not be introduced here in detail.

Figure 7:
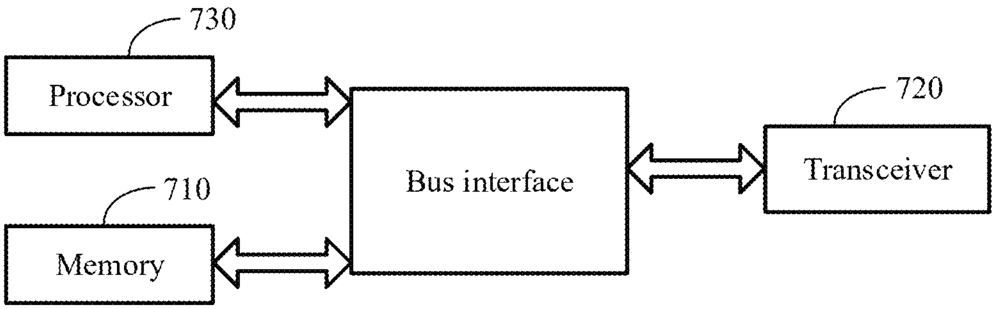
FIG. 7 shows a block diagram of a measurement configuration apparatus according to an embodiment of the present disclosure.

In order to better achieve the above objective, as shown in FIG. 7, an embodiment of the present disclosure provides a beam measurement apparatus, which includes: a memory 710, a transceiver 720 and a processor 730. The memory 710 is configured to store a computer program. The transceiver 720 is configured to perform data transceiving under the control of the processor 730; for example, the transceiver 720 is configured to receive and transmit data under the control of the processor 730. The processor 730 is configured to read the computer program in the memory 710 to execute the following operations:

transmitting, by a network device, resource configuration information for beam measurement to a terminal, where the resource allocation information includes beam measurement resources and first information; where the first information includes at least one of the following:

a parameter of a physical cell identifier list;

indication information associated with physical cell identifiers; or first indexes of the beam measurement resources, where the first indexes implicitly indicate physical cell identifiers.

Optionally, the processor 730 is configured to read the computer program in the memory 710 to perform the following operations: transmitting a first medium access control control element (MAC-CE) signaling to the terminal, where the first MAC-CE signaling carries a mapping relationship between the indication information and the physical cell identifiers.

Optionally, the processor 730 is configured to read the computer program in the memory 710 to perform the following operations:

transmitting a first radio resource control (RRC) signaling to the terminal, where the first RRC signaling is used to configure the mapping relationship between the indication information and the physical cell identifiers; and/or, transmitting a second MAC-CE signaling to the terminal, where the second MAC-CE signaling is used to update the mapping relationship between the indication information and the physical cell identifiers.

Optionally, the processor 730 is configured to read the computer program in the memory 710 to perform the following operations: transmitting a second RRC signaling to the terminal, where the second RRC signaling carries the beam measurement resources and the indication information corresponding to the beam measurement resources.

Optionally, the processor 730 is configured to read the computer program in the memory 710 to perform the following operations: transmitting a third RRC signaling to the terminal, where the third RRC signaling carries the beam measurement resources and the parameter of the physical cell identifier list.

Optionally, the processor 730 is configured to read the computer program in the memory 710 to perform the following operations: transmitting configuration information of a beam measurement report to the terminal, where the configuration information of the beam measurement report includes at least one of the following:

event-triggered beam measurement result reporting;

an offset of a parameter value for which a trigger event occurs; or relevant information of event-triggered beam measurement result reporting.

Optionally, the relevant information of the event-triggered beam measurement result reporting includes at least one of the following:

an interval between measurement reporting times when an event triggers reporting;

the quantity of beam measurement reports when an event triggers reporting;

a reporting amount when an event triggers reporting;

the maximum quantity of reported cells supported by event-triggered reporting.

Optionally, the processor 730 is configured to read the computer program in the memory 710 to perform the following operations: receiving a beam measurement result transmitted by the terminal, where the beam measurement result is obtained by the terminal through the beam measurement based on the resource configuration information.

Optionally, the processor 730 is configured to read the computer program in the memory 710 and perform at least one of the following operations:

receiving uplink control information (UCI) transmitted by the terminal, where the UCI carries the beam measurement result;

receiving a third MAC-CE signaling transmitted by the terminal, where the third MAC-CE signaling carries the beam measurement result;

receiving the beam measurement result transmitted by the terminal through an uplink channel of a configured grant reserved by the network device;

receiving the beam measurement result transmitted by the terminal through an uplink channel of contention free random access (CFRA); or receiving the beam measurement result transmitted by the terminal through an uplink channel of contention based random access (CBRA).

In FIG. 7, the bus architecture may include any quantity of interconnected buses and bridges. Specifically, various circuits of one or more processors represented by the processor 730 and a memory represented by the memory 710 are linked together. The bus architecture may also link various other circuits such as peripheral devices, voltage regulators, power management circuits, etc., which are well-known in the art, and therefore, no further descriptions are provided herein. The bus interface provides an interface. The transceiver 720 may be a plurality of elements, that is, include a transmitter and a receiver, and provide a unit for communicating with various other devices on transmission media. These transmission media include a wireless channel, a wired channel, an optical cable and other transmission media. The processor 730 is responsible for managing the bus architecture and general processing, and the memory 710 may store data used by the processor 730 when performing operations.

The processor 730 may be a central processing unit (Central Processing Unit, CPU), an application specific integrated circuit (Application Specific Integrated Circuit, ASIC), a field-programmable gate array (Field-Programmable Gate Array, FPGA) or a complex programmable logic device (Complex Programmable Logic Device, CPLD). The processor may also adopt a multi-core architecture.

It should be noted that the above apparatus provided in the embodiment of the present disclosure can implement all method steps implemented in the above method embodiments, and can achieve the same technical effects. Therefore, the description and the beneficial effect of this embedment that are the same as the method embodiments will not be introduced here in detail.

An embodiment of the present disclosure further provides a processor readable storage medium. The processor readable storage medium stores a computer program, and the computer program is configured to enable a processor to execute steps in the above-mentioned measurement configuration method, and can achieve the same technical effects.

Therefore, the description and the beneficial effect of this embedment that are the same as the method embodiments will not be introduced here in detail.

The processor readable storage medium may be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid state disk (SSD)), etc.

The following describes the measurement configuration method on the network device side and the beam measurement method on the terminal side of the present disclosure in conjunction with specific embodiments:

First Embodiment

A network device (such as a base station) configures CSI-ReportConfig and CSI-ResourceConfig through RRC, where the CSI-ResourceConfig includes a cell list {PCI1, PCI2, PCI3} to instruct a terminal to perform measurement on measurement resources in the cell list {PCI1, PCI2, PCI3}, and the resources for beam measurement are a resource set {SSB1, SSB2, SSB3, SSB4}; and it further indicates that the terminal uses an event-triggered reporting manner to report a beam measurement result (SSBRI+L1-RSRP+PCI), a trigger condition for event-triggered reporting is that a beam measurement result of a neighboring cell is 3 dB better than that of a serving cell, and the base station configures the maximum quantity of beams reported by the terminal to be 4.

The terminal receives the configuration information from the base station, and performs measurement on beams in the cell list {PCI1, PCI2, PCI3} on measurement resources {SSB1, SSB2, SSB3, SSB4} according to the instructions of the base station, to obtain measurement results as follows:

PCI1: L1-RSRP1_1, L1-RSRP1_2, L1-RSRP1_3, L1-RSRP1_4;

PCI2: L1-RSRP2_1, L1-RSRP2_2, L1-RSRP2_3, L1-RSRP2_4;

PCI3: L1-RSRP3_1, L1-RSRP3_2, L1-RSRP3_3, L1-RSRP3_4.

The terminal performs selection among the measurement results, and performs linear average on L1-RSRP values greater than a certain preset threshold (Threshold_RSRP) to obtain a measurement result of each cell as follows:

PCI1: L1-RSRP1_Avg;

PCI2: L1-RSRP2_Avg;

PCI3: L1-RSRP3_Avg.

The terminal compares a beam quality of a serving cell (PCI1) with beam qualities of neighboring cells (PCI2, PCI3), determines to meet an event trigger condition if L1-RSRP2_Avg-L1-RSRP1_Avg is greater than 3 dB, and determines not to meet an event trigger condition if L1-RSRP3_Avg-L1-RSRP1_Avg is less than 3 dB.

The terminal transmits an SR on a PUCCH to request the base station to allocate an uplink PUSCH resource. The base station allocates an uplink resource according to the request from the terminal, and notifies the terminal of the allocated PUSCH resource through an UL grant. The terminal transmits beam measurement results on the PUSCH resource allocated by the base station: {SSBRI1+L1-RSRP2_1+PCI2, SSBRI2+L1-RSRP2_2+PCI2, SSBRI3+L1-RSRP3_2+PCI2, SSBRI4+L1-RSRP2_4+PCI2}.

The terminal adopts an MAC-CE reporting manner, and in this case, the terminal may transmit inter-cell beam management (Inter-Cell Beam Management, ICBM) MAC-CE on the nearest available PUSCH resource. The content of the ICBM MAC-CE carries beam measurement results {SSBRI1+L1-RSRP2_1, SSBRI2+L1-RSRP2_2, SSBRI3+L1-RSRP3_2, SSBRI4+L1-RSRP2_4}+PCI2. If the terminal fails to find such PUSCH resource, the terminal transmits an SR on a PUCCH to request the base station to allocate an uplink resource, and the base station allocates an uplink resource according to the request of the terminal and transmits a UL grant to notify the terminal of the allocated PUSCH resource. The terminal transmits beam measurement results {SSBRI1+L1-RSRP2_1, SSBRI2+L1-RSRP2_2, SSBRI3+L1-RSRP3_2, SSBRI4+L1-RSRP2_4}+PCI2 on the PUSCH resource allocated by the base station.

Second Embodiment

A network device (such as a base station) configures CSI-ReportConfig and CSI-ResourceConfig through RRC, where the CSI-ResourceConfig includes a cell list {PCI1, PCI2, PCI3}, to instruct a terminal to perform measurement on measurement resources in the cell list {PCI1, PCI2, PCI3}, and the resources for beam measurement are a set of resources {SSB1, SSB2, SSB3, SSB4}; and it further indicates that the terminal uses an event-triggered reporting manner to report a beam measurement result (SSBRI+L1-RSRP+indicator), a trigger condition for event-triggered reporting is that a beam measurement result of a neighboring cell is 3 dB better than that of a serving cell, and the base station configures the maximum quantity of beams reported by the terminal to be 4. A correspondence between indicators (that is, indication information) and PCIs may be implemented by the system in a predefined manner. An example of the correspondence between indicators and PCIs is shown in Table 1.

TABLE 1

| | |
|---|---|
| Indicator1(00) | PCI1 |
| Indicator2(01) | PCI2 |
| Indicator3(11) | PCI3 |

The terminal receives the configuration information of the base station, and measures beams in the cell list {PCI1, PCI2, PCI3} on the measurement resources {SSB1, SSB2, SSB3, SSB4} according to the instructions of the base station, to obtain measurement results as follows:

PCI1: L1-RSRP1_1, L1-RSRP1_2, L1-RSRP1_3, L1-RSRP1_4;

PCI2: L1-RSRP2_1, L1-RSRP2_2, L1-RSRP2_3, L1-RSRP2_4;

PCI3: L1-RSRP3_1, L1-RSRP3_2, L1-RSRP3_3, L1-RSRP3_4.

The terminal performs selection on the measurement results, and performs linear average on L1-RSRP values greater than a certain preset threshold (Threshold_RSRP) to obtain a measurement result of each cell as follows:

PCI1: L1-RSRP1_Avg;

PCI2: L1-RSRP2_Avg;

PCI3: L1-RSRP3_Avg.

The terminal compares a beam quality of a serving cell (PCI1) with beam qualities of neighboring cells (PCI2, PCI3), determines to meet an event trigger condition if L1-RSRP2_Avg-L1-RSRP1_Avg is greater than 3 dB, and determines not to meet an event trigger condition if L1-RSRP3_Avg-L1-RSRP1_Avg is less than 3 dB.

The terminal transmits an SR on a PUCCH to request the base station to allocate an uplink PUSCH resource. The base station allocates an uplink resource according to the request of the terminal, and notifies the terminal of the allocated PUSCH resource through an UL grant. The terminal transmits beam measurement results on the PUSCH resource allocated by the base station: {SSBRI1+L1-RSRP2_1+Indicator2, SSBRI2+L1-RSRP2_2+Indicator2, SSBRI3+L1-RSRP3_2+Indicator2, SSBRI4+L1-RSRP2_4+Indicator2}.

The terminal adopts an MAC-CE reporting manner, and in this case, the terminal may transmit ICBM MAC-CE on the nearest available PUSCH resource. The content of the ICBM MAC-CE carries beam measurement results {SSBRI1+L1-RSRP2_1+Indicator2, SSBRI2+L1-RSRP2_2+Indicator2, SSBRI3+L1. RSRP3_2+Indicator2, SSBRI4+L1-RSRP2_4+Indicator2}. If the terminal fails to find such PUSCH resource, the terminal transmits an SR on a PUCCH to request the base station to allocate an uplink resource, and the base station allocates an uplink resource according to the request of the terminal and transmits a UL grant to notify the terminal of the allocated PUSCH resource. The terminal transmits beam measurement results {SSBRI1+L1-RSRP2_1+Indicator2, SSBRI2+L1-RSRP2_2+Indicator2, SSBRI3+L1-RSRP3_2+Indicator2, SSBRI4+L1-RSRP2_4+Indicator2} on the PUSCH resource allocated by the base station.

Third Embodiment

A network device (such as a base station) configures CSI-ReportConfig and CSI-ResourceConfig through RRC, to indicate that the reference signal resources for beam measurement by a terminal is a resource set {SSB1+indicator1, SSB2+indicator1, SSB3+indicator1, SSB4+indicator1, SSB1+indicator2, SSB2+indicator2, SSB3+indicator2, SSB4+indicator2, SSB1+indicator3, SSB2+indicator3, SSB3+indicator3, SSB4+indicator3}. Each SSB resource carries one indicator (that is, indication information), and the indicator is associated with a physical cell ID. An initial association relationship is realized through RRC configuration, and the association relationship between indicators and physical cells is dynamically updated through MAC-CE. For example, at time n, a mapping between indicators and physical cell IDs is shown in Table 2.

TABLE 2

| | |
|---|---|
| Indicator1(00) | PCI1 |
| Indicator2(01) | PCI2 |
| Indicator3(11) | PCI3 |

At time n+K, the mapping relationship between indicators and physical cells is updated through MAC-CE, as shown in Table 3.

TABLE 3

| | |
|---|---|
| Indicator1(00) | PCI3 |
| Indicator2(01) | PCI2 |
| Indicator3(11) | PCI1 |

It instructs the terminal to report a beam measurement result (SSBRI+L1-RSRP+indicator) using an event-triggered reporting manner, and a condition for triggering an event-triggered report is that a beam measurement result of a neighboring cell is better than that of a serving cell by 3 dB, and the base station configures the maximum quantity of beams reported by the terminal to be 4.

The terminal receives the configuration information of the base station, and performs measurement on the measurement resources {SSB1, SSB2, SSB3, SSB4} according to the instructions of the base station at time n+K, to obtain measurement results as follows:

PCI1: L1-RSRP1_1, L1-RSRP1_2;

PCI2: L1-RSRP2_1, L1-RSRP2_2, L1-RSRP2_3;

PCI3; L1-RSRP3_1, L1-RSRP3_3, L1-RSRP3_4.

The terminal compares the measurement results with the L1-RSRP value of a preset threshold (Threshold_RSRP) to obtain measurement result(s) of each cell as follows:

PCI1: L1-RSRP1_1;

PCI2: L1-RSRP2_1, L1-RSRP2_3;

PCI3: L1-RSRP3_1.

The terminal linearly averages beam measurement value (s) of each cell greater than the preset threshold to obtain a beam quality of each cell:

PCI1: L1-RSRP1_Avg.

PCI2: L1-RSRP2_Avg.

PCI3: L1-RSRP3_Avg.

The terminal compares a beam quality of a serving cell (PCI1) with beam qualities of neighboring cells (PCI2, PCI3), determines a case L1-RSRP3_Avg>L1-RSRP1_Avg>L1-RSRP2_Avg, and determines to meet an event trigger condition if L1-RSRP3_Avg-L1-RSRP1_Avg is greater than 3 dB. The terminal determines a measurement report quantity: SSBRI1+L1-RSRP3_1+indicator 1, SSBRI1+L1-RSRP1_1+indicator3.

The terminal transmits an SR on a PUCCH, to request the base station to allocate an uplink PUSCH resource, and to request that the quantity of PUSCH resources to be allocated by the base station is 2. The base station receives the request of the terminal, allocates uplink resources according to the request of the terminal, and notifies the terminal of the allocated PUSCH resources through an UL grant. The terminal transmits the beam measurement results on the PUSCH resources allocated by the base: station: {SSBRI1+L1-RSRP3_1+indicator 1, SSBRI1+L1-RSRP1_1+indicator 3}.

The terminal may also transmit the beam measurement results on a resource of a configured grant based PUSCH (configured grant based PUSCH).

Fourth Embodiment

A base station configures CSI-ReportConfig and CSI-ResourceConfig through RRC, to instruct a terminal to perform beam measurement by using a resource set {SSB1, SSB2, SSB3, SSB4} as reference signal resources. At the same time, the base station may implicitly instruct the terminal to perform beam measurement for cell identifiers PCI1, PCI2, and PCI3, based on indexes of the reference signal resources. The reference signal resources for measurement are renumbered according to an algorithm predefined by the system, as shown in Table 4.

TABLE 4

| | |
|---|---|
| SSB1 | PCI1 |
| SSB2 | PCI1 |
| SSB3 | PCI1 |
| SSB4 | PCI1 |
| SSB5 | PCI2 |
| SSB6 | PCI2 |
| SSB7 | PCI2 |

TABLE 4-continued

| | |
|---|---|
| SSB8 | PCI2 |
| SSB9 | PCI3 |
| SSB10 | PCI3 |
| SSB11 | PCI3 |
| SSB12 | PCI3 |

At the same time, the base station instructs the terminal to adopt an event-triggered reporting manner for reporting a beam measurement result (SSBRI+L1-RSRP), and a condition for triggering an event-triggered report is that a beam measurement result of a neighboring cell is better than that of a serving cell by 3 dB, and the base station configures the maximum quantity of beams reported by the terminal to be 4.

The terminal receives the configuration information of the base station, and performs measurement on the measurement resources {SSB1, SSB2, SSB3, . . . , SSB12} according to the instructions of the base station, to obtain measurement results as follows:

PCI1: L1-RSRP1_1, L1-RSRP1_2, L1-RSRP1_3, L1-RSRP1_4;

PCI2: L1-RSRP2_5, L1-RSRP2_6, L1-RSRP2_7, L1-RSRP2_8;

PCI3: L1-RSRP3_9, L1-RSRP3_10, L1-RSRP3_11, L1-RSRP3_12.

The terminal compares the measurement results with an L1-RSRP value of a preset threshold (Threshold_RSRP) to obtain measurement result(s) of each cell as follows:

PCI1: L1-RSRP1_1, L1-RSRP1_4;

PCI2: L1-RSRP2_6;

PCI3: L1-RSRP3_9, L1-RSRP3_10, L1-RSRP3_11.

The terminal linearly averages beam measurement value (s) of each cell greater than the preset threshold to obtain a beam quality of each cell:

PCI1: L1-RSRP1_Avg;

PCI2: L1-RSRP2_Avg;

PCI3: L1-RSRP3_Avg.

The terminal compares a beam quality of a serving cell (PCI1) with beam qualities of neighboring cells (PCI2, PCI3), determines a case L1-RSRP3_Avg>L1-RSRP1_Avg>L1-RSRP2_Avg, and determines to meet an event trigger condition if L1-RSRP3_Avg-L1-RSRP1_Avg is greater than 3 dB. The terminal determines a measurement report quantity: SSBRI9+L1-RSRP3_9, SSBRI10+L1-RSRP3_10, SSBRI11+L1-RSRP3_11, SSBRI1+L1-RSRP1_1.

The embodiments of the present disclosure can implement beam measurement and beam measurement result reporting of L1/L2 inter-cell beam management, thereby solving problems that beam measurement reporting in the existing mobility measurement has a relatively large delay, and is not suitable for beam management in a fast movement scenario.

Those skilled in the art should appreciate that the embodiments of the present application may be provided as a method, a system, or a computer program product. Therefore, the present application may take the form of complete hardware embodiments, complete software embodiments, or embodiments combining software and hardware. Moreover, the present application may take the form of a computer program product implemented on one or more computer usable storage media (including but not limited to magnetic disk storage, optical storage, etc.) including a computer usable program code.

The present application is described with reference to the flow chart and/or the block diagram of the method, device (system), and computer program product according to the embodiments of the present application. It should be appreciated that each of processes and/or blocks in a flow chart and/or a block diagram, and a combination of the processes and/or blocks in the flow chart and/or block diagram may be implemented by computer executable instructions. These computer executable instructions may be provided to a processor of a general-purpose computer, a specialized computer, an embedded processing device, or other programmable data processing devices to generate a machine, such that the instructions, which are executed via the processor of the computer or other programmable data processing device, create means for implementing the functions specified in one or more of processes in a flow chart, and/or in one or more of blocks in a block diagram.

These processor executable instructions may also be stored in processor-readable memory that may guide computers or other programmable data processing devices to work in a specific way, causing the instructions stored in the processor readable memory to generate a manufacturing product including instruction devices that implement the functions specified in one or more of processes in a flow chart, and/or in one or more of blocks in a block diagram.

These processor executable instructions may also be loaded onto a computer or other programmable data processing device, enabling a series of operational steps to be performed on the computer or other programmable device to generate computer-implemented processing, such that the instructions which are executed on the computer or other programmable device provide steps for implementing the functions specified in one or more of processes in a flow chart, and/or in one or more of blocks in a block diagram.

It should be further noted that in the apparatuses and the methods of the present disclosure, obviously, various components or various steps can be decomposed and/or recombined. Such decomposition and/or recombination shall be considered as an equivalent solution of the present disclosure. Moreover, the steps to perform the above series of processes can naturally be executed chronologically in the described order, but they do not necessarily need to be performed chronologically, and some steps can be executed in parallel or independently of each other. It may be appreciated by persons of ordinary skill in the art that, all or any of the steps or components of the methods and apparatuses of the present disclosure can be implemented in hardware, firmware, software, or a combination thereof in any computing device (including processor, storage medium, etc.) or in a network of computing devices, which can be achieved by persons of ordinary skill in the art by using their basic programming skills after reading the description of the present disclosure.

It should be noted and understood that the division of various modules in the present disclosure is only a division of logical functions, which may be fully or partially integrated into a physical entity or physically separated in actual implementations. These modules may all be implemented in the form of software called by processing elements; or may all be implemented in the form of hardware; or, some modules may be implemented in the form of software called by processing elements, and some modules may be implemented in the form of hardware. For example, the determination module may be a separate processing element, or may be integrated into a certain chip of the above device, or, may be stored in the memory of the above device in the form of program code which is called and executed by a certain processing element of the above device to perform the functions of the determination module. Other modules have similar implementations. In addition, all or part of these modules may be integrated together, and may be implemented independently. The processing element mentioned here may be an integrated circuit with signal processing capability. In the implementation process, the various steps of the above method or the above various modules may be implemented by an integrated logic circuit in hardware form in elements of a processor or instructions in the form of software.

For example, the various modules, units, subunits or submodules may be one or more integrated circuits configured to implement the above methods, such as one or more application specific integrated circuits (Application Specific Integrated Circuit, ASIC), or one or more microprocessors (digital signal processor, DSP), or one or more field programmable gate arrays (Field Programmable Gate Array, FPGA). As another example, when a module described above is implemented in the form of program codes called by a processing element, the processing element may be a general purpose processor, such as a central processing unit (Central Processing Unit, CPU) or other processors that may call program codes. As another example, these modules may be integrated together and implemented as a system-on-a-chip (system-on-a-chip, SOC).

Terms such as "first" and "second" in the specification and the claims of the present disclosure are used for distinguishing similar objects and are not necessarily used for describing a specific order or sequence. It should be understood that the terms used in this way may be interchanged under appropriate circumstances, so that the embodiments of the present disclosure described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent in the process, method, product, or device. Moreover, the term "and/or" used in the specification and the claims indicates at least one of connected objects, for example, A and/or B and/or C means 7 situations including: A alone, B alone, C alone, both A and B, both B and C, both A and C, and all of A, B and C. Similarly, the use of "at least one of A and B" in this specification and claims should be understood as "A alone, B alone, or both A and B".

Apparently, a person of ordinary skills in the art can make various modifications and variations to the present application without departing from the spirit and scope of the present application. In this way, if these modifications and variations of the present application fall within the scope of the claims and their equivalent technologies, the present application also intends to include these modifications and variations.

What is claimed is:

1. A beam measurement method, comprising:

receiving, by a terminal, resource configuration information for beam measurement transmitted by a network device, wherein the resource configuration information comprises beam measurement resources and first information; and performing, by the terminal, beam measurement according to the beam measurement resources and the first information, wherein the first information comprises at least one of the following:

a parameter of a physical cell identifier list;

indication information associated with physical cell identifiers; or first indexes of the beam measurement resources, wherein the first indexes implicitly indicate the physical cell identifiers;

wherein the performing, by the terminal, beam measurement according to the beam measurement resources and the first information comprises:

determining, by the terminal, cells for beam measurement corresponding to the beam measurement resources, based on the beam measurement resources and the indication information associated with the physical cell identifiers and corresponding to the beam measurement resources; and performing, by the terminal, beam measurement for the cells on the beam measurement resources.

2. The beam measurement method according to claim 1, wherein the performing, by the terminal, beam measurement according to the beam measurement resources and the first information comprises:

determining, by the terminal, cells for beam measurement based on the parameter of the physical cell identifier list; and performing, by the terminal, beam measurement for the cells on the beam measurement resources.

3. The beam measurement method according to claim 1, further comprising:

receiving, by the terminal, a first medium access control control element (MAC-CE) signaling transmitted by the network device, wherein the first MAC-CE signaling carries a mapping relationship between the indication information associated with the physical cell identifiers and the physical cell identifiers, wherein the performing, by the terminal, beam measurement according to the beam measurement resources and the first information comprises:

determining, by the terminal, cells for beam measurement corresponding to the beam measurement resources based on the mapping relationship between the indication information and the physical cell identifiers; and performing, by the terminal, beam measurement for the cells on the beam measurement resources.

4. The beam measurement method according to claim 1, further comprising:

receiving, by the terminal, a first radio resource control (RRC) signaling transmitted by the network device; and/or, receiving, by the terminal, a second MAC-CE signaling transmitted by the network device, wherein the first RRC signaling is used to configure a mapping relationship between the indication information and the physical cell identifiers, and the second MAC-CE signaling is used to update the mapping relationship between the indication information and the physical cell identifiers, wherein the performing, by the terminal, beam measurement according to the beam measurement resources and the first information comprises:

determining, by the terminal, cells for beam measurement corresponding to the beam measurement resources based on the first RRC signaling, and performing beam measurement for the cells on the beam measurement resources; or, determining, by the terminal, cells for beam measurement corresponding to the beam measurement resources based on the second RRC signaling, and performing beam measurement for the cells on the beam measurement resources.

5. The beam measurement method according to claim 1, wherein the performing, by the terminal, beam measurement according to the beam measurement resources and the first information comprises:

determining, by the terminal, a beam measurement resource corresponding to each of the physical cell identifiers based on the first indexes of the beam measurement resources; and performing, by the terminal, beam measurement for a target cell on the beam measurement resource corresponding to the target cell corresponding to each of the physical cell identifiers.

6. The beam measurement method according to claim 5, further comprising:

determining, by the terminal, second indexes corresponding to the physical cell identifiers based on a rule predefined by a system; and transmitting, by the terminal to the network device, beam measurement results of physical cells corresponding to the second indexes.

7. The beam measurement method according to claim 1, further comprising:

receiving, by the terminal, configuration information of a beam measurement report transmitted by the network device; and transmitting, by the terminal to the network device, a beam measurement result obtained from the beam measurement based on the configuration information of the beam measurement report, wherein the configuration information of the beam measurement report comprises at least one of the following:

event-triggered beam measurement result reporting;

an offset of a parameter value for which a trigger event occurs; or relevant information of event-triggered beam measurement result reporting.

8. The beam measurement method according to claim 7, wherein the relevant information of event-triggered beam measurement result reporting comprises at least one of the following:

an interval between measurement reporting times when an event triggers reporting;

the quantity of beam measurement reports when an event triggers reporting;

a reporting amount when an event triggers reporting; or the maximum quantity of reported cells supported by event-triggered reporting.

9. The beam measurement method according to claim 7, wherein in a case where the configuration information of the beam measurement report comprises the offset of the parameter value for which the trigger event occurs, the transmitting, by the terminal to the network device, the beam measurement result obtained from the beam measurement based on the configuration information of the beam measurement report comprises:

determining a difference between a beam quality of a neighboring cell and a beam quality of a serving cell based on the beam measurement result obtained from the beam measurement; and transmitting, by the terminal to the network device, the beam measurement result obtained from the beam measurement, in a case where the difference is greater than the offset of the parameter value for which the trigger event occurs.

10. A measurement configuration method, comprising:

transmitting, by a network device, resource configuration information for beam measurement to a terminal, wherein the resource configuration information comprises beam measurement resources and first information, wherein the first information comprises at least one of the following:

a parameter of a physical cell identifier list;

indication information associated with physical cell identifiers; or first indexes of the beam measurement resources, wherein the first indexes implicitly indicate physical cell identifiers;

the method further comprising:

transmitting, by the network device, a first radio resource control (RRC) signaling to the terminal, wherein the first RRC signaling is used to configure a mapping relationship between the indication information and the physical cell identifiers; and/or, transmitting, by the network device, a second MAC-CE signaling to the terminal, wherein the second MAC-CE signaling is used to update a mapping relationship between the indication information and the physical cell identifiers; and transmitting, by the network device, a second RRC signaling to the terminal, wherein the second RRC signaling carries the beam measurement resources and the indication information corresponding to the beam measurement resources.

11. The measurement configuration method according to claim 10, further comprising:

transmitting, by the network device, a first medium access control control element (MAC-CE) signaling to the terminal, wherein the first MAC-CE signaling carries a mapping relationship between the indication information and the physical cell identifiers.

12. The measurement configuration method according to claim 10, wherein the transmitting, by the network device, the resource configuration information for beam measurement to the terminal comprises:

transmitting, by the network device, a third RRC signaling to the terminal, wherein the third RRC signaling carries the beam measurement resources and the parameter of the physical cell identifier list.

13. The measurement configuration method according to claim 10, further comprising:

transmitting, by the network device, configuration information of a beam measurement report to the terminal, wherein the configuration information of the beam measurement report comprises at least one of the following:

event-triggered beam measurement result reporting;

an offset of a parameter value for which a trigger event occurs; or relevant information of event-triggered beam measurement result reporting.

14. The measurement configuration method according to claim 13, wherein the relevant information of the event-triggered beam measurement result reporting comprises at least one of the following:

an interval between measurement reporting times when an event triggers reporting;

the quantity of beam measurement reports when an event triggers reporting;

a reporting amount when an event triggers reporting;

the maximum quantity of reported cells supported by event-triggered reporting.

15. The measurement configuration method according to claim 10, further comprising:

receiving, by the network device, a beam measurement result transmitted by the terminal, wherein the beam measurement result is obtained by the terminal through the beam measurement based on the resource configuration information.

16. A measurement configuration apparatus, comprising a memory, a transceiver and a processor, wherein the memory is configured to store a computer program; the transceiver is configured to transmit and receive data under the control of the processor; the processor is configured to read the computer program in the memory to perform the measurement configuration method according to claim 10.

17. A beam measurement apparatus, comprising a memory, a transceiver and a processor, wherein the memory is configured to store a computer program; the transceiver is configured to transmit and receive data under the control of the processor; the processor is configured to read the computer program in the memory to perform the following operations:

receiving resource configuration information for beam measurement transmitted by a network device, wherein the resource configuration information comprises beam measurement resources and first information; and performing a beam measurement according to the beam measurement resources and the first information, wherein the first information comprises at least one of the following:

a parameter of a physical cell identifier list;

indication information associated with physical cell identifiers; or first indexes of the beam measurement resources, wherein the first indexes implicitly indicate physical cell identifiers;

wherein the performing, by the terminal, beam measurement according to the beam measurement resources and the first information comprises:

determining, by the terminal, cells for beam measurement corresponding to the beam measurement resources, based on the beam measurement resources and the indication information associated with the physical cell identifiers and corresponding to the beam measurement resources; and performing, by the terminal, beam measurement for the cells on the beam measurement resources.

* * * * *